(12) United States Patent
Mimura et al.

(10) Patent No.: US 11,267,484 B2
(45) Date of Patent: Mar. 8, 2022

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Yoshitaka Mimura, Wako (JP); Naotaka Kumakiri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 355 days.

(21) Appl. No.: 16/083,522

(22) PCT Filed: Mar. 16, 2016

(86) PCT No.: PCT/JP2016/058374
§ 371 (c)(1),
(2) Date: Sep. 10, 2018

(87) PCT Pub. No.: WO2017/158772
PCT Pub. Date: Sep. 21, 2017

(65) Prior Publication Data
US 2020/0298876 A1  Sep. 24, 2020

(51) Int. Cl.
*B60W 60/00* (2020.01)
*B60W 10/20* (2006.01)
(Continued)

(52) U.S. Cl.
CPC .......... *B60W 60/001* (2020.02); *B60W 10/20* (2013.01); *B60W 40/08* (2013.01);
(Continued)

(58) Field of Classification Search
CPC ......... B60W 60/0051; B60W 60/0053; B60W 60/001; B60W 60/0059
See application file for complete search history.

(56) References Cited

U.S. PATENT DOCUMENTS 8,260,482 B1 *  9/2012  Szybalski ............ B62D 15/025
701/23
2015/0070160 A1 *  3/2015  Davidsson .......... G05D 1/0061
340/457

(Continued)

FOREIGN PATENT DOCUMENTS

CN  105270414  1/2016
CN  105365823  3/2016
(Continued)

OTHER PUBLICATIONS

International Search Report and Written Opinion for International Patent Application No. PCT/JP2016/058374 dated Jun. 7, 2016, 9 pages.

(Continued)

*Primary Examiner* — Peter D Nolan
*Assistant Examiner* — Kenneth M Dunne
(74) *Attorney, Agent, or Firm* — Amin, Turocy & Watson, LLP

(57) ABSTRACT

A vehicle control system includes an automated driving control unit that automatically controls at least one of acceleration/deceleration and steering of a subject vehicle, the automated driving control unit performing automated driving control in any one of a plurality of modes with different degrees of automated driving, and an interface control unit that receives an operation of an occupant of the subject vehicle and restricts an operation with respect to an interface device on which predetermined information is output, according to the mode of automated driving performed by the automated driving control unit, and when the change to the mode of the automated driving in which the degree of automated driving decreases is performed in a state in which the restriction is relaxed or released, the interface control unit causes a state of the interface device to return to a state before the restriction is relaxed or released (Continued)

188 HMI CONTROL INFORMATION

| ESTIMATED STATE OF VEHICLE OCCUPANT | DRIVING INTENTION LEVEL (DEGREE) | NOTIFICATION START TIME | NOTIFICATION START SPEED | ... |
|---|---|---|---|---|
| ASLEEP | 1 | 3 MINUTES AGO | 20 KM/H OR MORE | ... |
| WATCHING DVD IMAGE | 2 | 2 MINUTES AGO | 25 KM/H OR MORE | ... |
| OPERATING NAVIGATION DEVICE | 3 | 1 MINUTE AGO | 30 KM/H OR MORE | ... |
| LOOKING AT TRAVELING DIRECTION | 4 | 30 SECONDS AGO | 35 KM/H OR MORE | ... |
| GRIPING STEERING WHEEL | 5 | 15 SECONDS AGO | 40 KM/H OR MORE | ... |
| ... | ... | ... | ... | ... | or performs a predetermined notification before a predetermined time at which the change of the mode of the automated driving is performed.

12 Claims, 14 Drawing Sheets

(51) Int. Cl.
  *B60W 40/08* (2012.01)
  *B60W 50/14* (2020.01)
(52) U.S. Cl.
  CPC ........ *B60W 50/14* (2013.01); *B60W 60/0055* (2020.02); *B60W 2540/229* (2020.02)

(56) References Cited

U.S. PATENT DOCUMENTS

| | | | | |
|---|---|---|---|---|
| 2016/0311323 | A1* | 10/2016 | Lee | B60K 35/00 |
| 2016/0357185 | A1* | 12/2016 | Laur | B60W 50/0098 |
| 2016/0378114 | A1* | 12/2016 | Laur | B60W 50/14 |
| | | | | 701/23 |
| 2017/0021837 | A1* | 1/2017 | Ebina | B60W 50/082 |
| 2019/0204827 | A1* | 7/2019 | Bhalla | G05D 1/0061 |

FOREIGN PATENT DOCUMENTS

| | | |
|---|---|---|
| JP | 2007-128430 | 5/2007 |
| JP | 2009-298201 | 12/2009 |
| JP | 2015-182624 | 10/2015 |
| JP | 2015-217798 | 12/2015 |
| WO | 2015-162764 | 10/2015 |

OTHER PUBLICATIONS

Chinese Office Action for Chinese Patent Application No. 201680083406.8 dated Nov. 2, 2020.

\* cited by examiner

FIG. 13

188 HMI CONTROL INFORMATION

| ESTIMATED STATE OF VEHICLE OCCUPANT | DRIVING INTENTION LEVEL (DEGREE) | NOTIFICATION START TIME | NOTIFICATION START SPEED | ... |
|---|---|---|---|---|
| ASLEEP | 1 | 3 MINUTES AGO | 20 KM/H OR MORE | ... |
| WATCHING DVD IMAGE | 2 | 2 MINUTES AGO | 25 KM/H OR MORE | ... |
| OPERATING NAVIGATION DEVICE | 3 | 1 MINUTE AGO | 30 KM/H OR MORE | ... |
| LOOKING AT TRAVELING DIRECTION | 4 | 30 SECONDS AGO | 35 KM/H OR MORE | ... |
| GRIPING STEERING WHEEL | 5 | 15 SECONDS AGO | 40 KM/H OR MORE | ... |
| ... | ... | ... | ... | ... |

FIG. 14

190 MODE-SPECIFIC OPERATION AVAILABILITY INFORMATION

| DRIVING MODE / NON-DRIVING OPERATION SYSTEM | MANUAL DRIVING MODE | AUTOMATED DRIVING MODE | | | ... |
|---|---|---|---|---|---|
| | | FIRST MODE | SECOND MODE | THIRD MODE | |
| NAVIGATION OPERATION | UNAVAILABLE | AVAILABLE | AVAILABLE | UNAVAILABLE | ... |
| CONTENT REPRODUCTION OPERATION | UNAVAILABLE | AVAILABLE | UNAVAILABLE | UNAVAILABLE | ... |
| INSTRUMENT PANEL OPERATION | UNAVAILABLE | AVAILABLE | AVAILABLE | AVAILABLE | ... |
| ... | ... | ... | ... | ... | ... |

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

In recent years, research on technology for automatically controlling at least one of acceleration/deceleration and steering of a subject vehicle so that the subject vehicle travels along a route to a destination (hereinafter referred to as automated driving) has been performed. In relation to this, an information display device including a display control means for determining an automated driving level on the basis of a system state of an automatically driven vehicle and causing an image of an operating unit of the vehicle and an image of a part of a person operating the operating unit to be simultaneously displayed on a display means according to the automated driving level is known (see, for example, Patent Document 1).

CITATION LIST

Patent Literature

[Patent Literature 1] Japanese Unexamined Patent Application, First Publication No. 2015-182624

SUMMARY OF INVENTION

Technical Problem

However, in the related art, switching to each mode in automated driving is automatically performed at a timing at which preset switching conditions are established. Accordingly, there is a likelihood of a situation in which a vehicle occupant is not ready occurring.

The present invention has been made in consideration of such circumstances, and an object of the present invention is to provide a vehicle control system, a vehicle control method, and a vehicle control program capable of giving a period of preparation for switching of automated driving to a vehicle occupant.

Solution to Problem

A present invention according to claim 1 is a vehicle control system (120) including: an automated driving control unit that automatically controls at least one of acceleration/deceleration and steering of a subject vehicle, the automated driving control unit performing automated driving control in any one of a plurality of modes with different degrees of automated driving; and an interface control unit (174) that receives an operation of an occupant of the subject vehicle and restricts an operation with respect to an interface device (70) on which predetermined information is output, according to the mode of automated driving performed by the automated driving control unit, wherein when a change to a mode of automated driving in which the degree of automated driving decreases is performed in a state in which the restriction is relaxed or released, the interface control unit causes a state of the interface device to return to a state before the restriction is relaxed or released or performs a predetermined notification before a predetermined time at which the change of the mode of the automated driving is performed.

According to a present invention according to claim 2, in the present invention according to claim 1, the predetermined notification is information indicating that the change to the mode of automated driving is to be performed in the interface device or a notification indicating that the state of the interface device returns to the state before the restriction is relaxed or released.

According to a present invention according to claim 3, in the present invention according to claim 1, the predetermined time is set according to a state of the occupant or a state of the subject vehicle.

According to a present invention according to claim 4, in the present invention according to claim 1, the interface control unit causes predetermined information to be output on the interface device before the predetermined time at which the change to the mode of the automated driving in which the degree of automated driving decreases is performed.

According to a present invention according to claim 5, in the present invention according to claim 1, the interface control unit causes predetermined information to be output on the interface device when the mode of automated driving is changed to a mode in which the degree of automated driving decreases on a speed basis, and a speed of the subject vehicle which is approaching a first speed serving as a reference for a change reaches a second speed lower than the speed reference.

According to a present invention according to claim 6, in the present invention according to claim 5, the interface control unit restricts an operation of an occupant with respect to the interface device when the speed of the subject vehicle reaches a third speed higher than the second speed and lower than the first speed.

According to a present invention according to claim 7, the present invention according to claim 1 further includes a state estimation unit that estimates a state of an occupant in the subject vehicle, wherein the state estimation unit determines a timing at which predetermined information is caused to be output on the interface device according to the estimated state of the occupant of the subject vehicle.

According to a present invention according to claim 8, in the present invention according to claim 1, the interface control unit changes the presence or absence or an aspect of output of predetermined information on the basis of a use state of the interface device.

According to a present invention according to claim 9, in the present invention according to claim 1, the interface control unit causes predetermined information to be output on an interface device that is in a line-of-sight direction of the occupant of the subject vehicle.

According to a present invention according to claim 10, in the present invention according to claim 1, the degree of automated driving is one or both of the degree of surroundings monitoring obligation required of the occupant of the subject vehicle and the degree of operation tolerance of the interface device for the occupant of the subject vehicle.

A present invention according to claim 11 is a vehicle control method including: automatically controlling, by an in-vehicle computer, at least one of acceleration/deceleration and steering of a subject vehicle and performing automated driving control in any one of a plurality of modes with different degrees of automated driving; receiving, by the in-vehicle computer, an operation of an occupant of the subject vehicle and restricting an operation with respect to an interface device on which predetermined information is output, according to the mode of automated driving performed in automated driving control; and when the change to the mode of the automated driving in which the degree of automated driving decreases is performed in a state in which the restriction is relaxed or released, causing, by the in-vehicle computer, a state of the interface device to return to a state before the restriction is relaxed or released or performing a predetermined notification before a predetermined time at which the change of the mode of the automated driving is performed.

A present invention according to claim 12 is a vehicle control program for causing an in-vehicle computer to execute a process of: automatically controlling at least one of acceleration/deceleration and steering of a subject vehicle and performing automated driving control in any one of a plurality of modes with different degrees of automated driving; receiving an operation of an occupant of the subject vehicle and restricting an operation with respect to an interface device on which predetermined information is output, according to the mode of automated driving performed in the automated driving control; and when the change to the mode of the automated driving in which the degree of automated driving decreases is performed in a state in which the restriction is relaxed or released, causing a state of the interface device to return to a state before the restriction is relaxed or released or performing a predetermined notification before a predetermined time at which the change of the mode of the automated driving is performed.

Advantageous Effects of Invention

According to the inventions described in claims 1 to 3 and 10 to 12, it is possible to notify the occupant that the surroundings monitoring obligation of the subject vehicle is transferred to the occupant before the shifting. Therefore, it is possible to give a period of preparation for switching to automated driving to the occupant.

According to the inventions described in claims 4 and 5, the occupant can perform preparation for surroundings monitoring before the degree of automated driving decreases.

According to the invention described in claim 6, it is possible to seamlessly perform the output of information on the interface device, the restriction of an operation of the occupant with respect to the interface device, and the switching of the automated driving mode with reference to the speed of the subject vehicle.

According to the invention described in claim 7, since the occupant can acquire the information from the interface device at a timing suitable for a current state of the occupant, it is possible to reliably perform preparation for switching of the automated driving.

According to the invention described in claim 8, the occupant can acquire appropriate information on switching of the driving mode from the interface device.

According to the invention described in claim 9, it is possible to cause the occupant to recognize the output information more reliably.

BRIEF DESCRIPTION OF DRAWINGS

FIG. 13 is a diagram illustrating an example of HMI control information 188.

FIG. 14 is a diagram illustrating an example of mode-specific operation availability information 190.

DESCRIPTION OF EMBODIMENTS

Embodiments of a vehicle control system, a vehicle control method, and a vehicle control program according to the present invention will be described below with reference to the drawings.

<Common Configuration>

Figure 1:
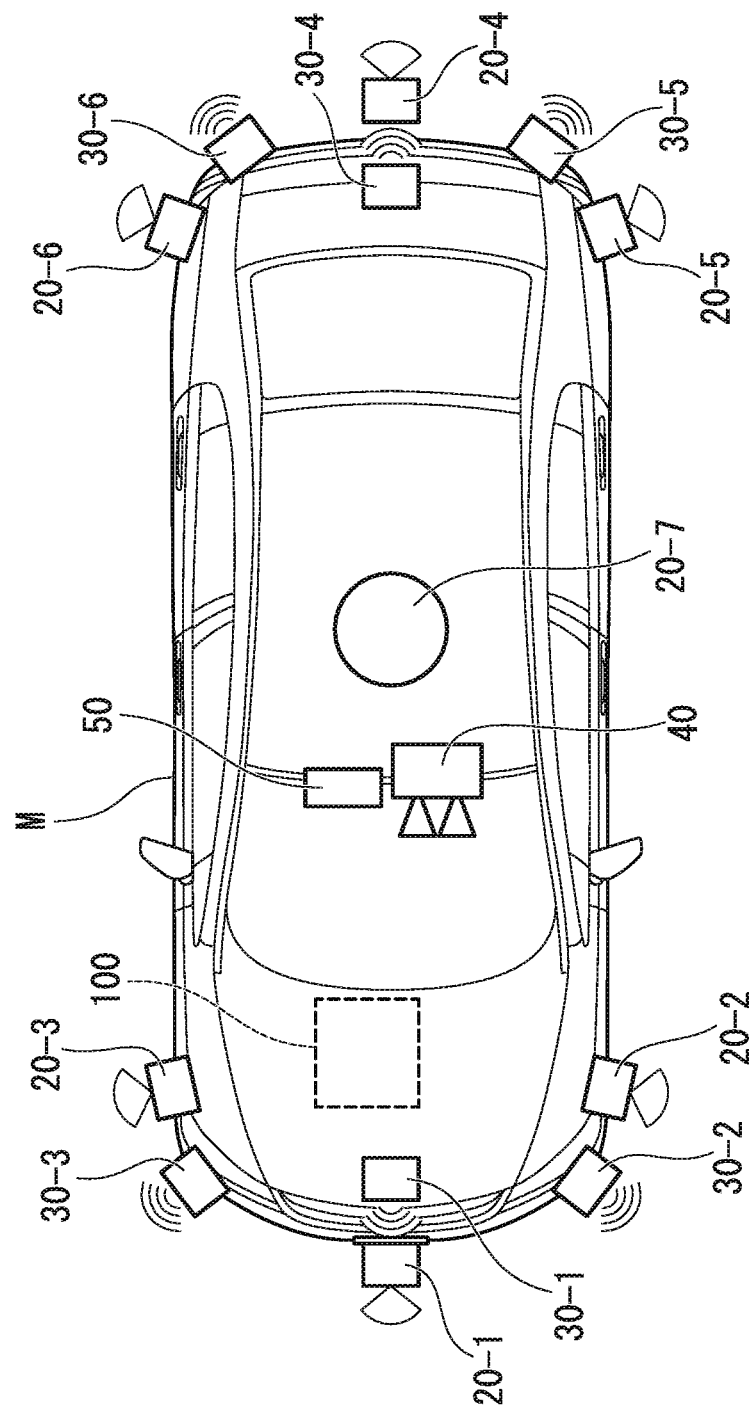
FIG. 1 is a diagram illustrating components of a vehicle in which a vehicle control system 100 of an embodiment is mounted.

FIG. 1 is a diagram illustrating components of a vehicle in which a vehicle control system 100 of an embodiment is mounted (hereinafter referred to as a subject vehicle M). The vehicle on which the vehicle control system 100 is mounted is, for example, a two-wheeled car, a three-wheeled car, or a four-wheeled car, and includes a car using an internal combustion engine such as a diesel engine or a gasoline engine as a power source, an electric car using an electric motor as a power source, or a hybrid car with an internal combustion engine and an electric motor. The electric car is driven using electric power that is discharged by a battery such as a secondary battery, a hydrogen fuel cell, a metal fuel cell, or an alcohol fuel cell, for example.

As illustrated in FIG. 1, sensors such as finders 20-1 to 20-7, radars 30-1 to 30-6, and a camera (an imaging unit) 940, a navigation device (a display unit) 50, and the vehicle control system 100 are mounted in the subject vehicle M.

The finders 20-1 to 20-7 are, for example, light detection and ranging or laser imaging detection and ranging (LIDAR) finders that measure scattered light with respect to irradiation light and measure a distance to a target. For example, the finder 20-1 may be attached to a front grille or the like, and the finders 20-2 and 20-3 may be attached to a side surface of a vehicle body, a door mirror, the inside of a headlight, the vicinity of side lamps, and the like. The finder 20-4 is attached to a trunk lid or the like, and the finders 20-5 and 20-6 are attached to the side surface of the vehicle body, the inside of a taillight, or the like. The finders 20-1 to 20-6 described above have, for example, a detection area of about 150° in a horizontal direction. Further, the finder 20-7 may be attached to a roof or the like. The finder 20-7 has, for example, a detection area of 360° in the horizontal direction.

The radars 30-1 and 30-4 described above are, for example, long-distance millimeter-wave radars of which the detection area in a depth direction is wider than those of other radars. Further, the radars 30-2, 30-3, 30-5, and 30-6 are intermediate-distance millimeter wave radars of which the detection area in the depth direction is narrower than those of the radars 30-1 and 30-4.

Hereinafter, the finders 20-1 to 20-7 are simply referred to as a "finder 20" when not particularly distinguished, and the radars 30-1 to 30-6 are simply referred to as a "radar 30" when not particularly distinguished. The radar 30 detects an object using, for example, a frequency modulated continuous wave (FM-CW) scheme.

The camera 40 is, for example, a digital camera using an individual imaging element such as a charge coupled device (CCD) or a complementary metal oxide semiconductor (CMOS). The camera 40 is attached to an upper portion of a front windshield, a rear surface of a rearview mirror, or the like. The camera 40 periodically and repeatedly images, for example, in front of the subject vehicle M. The camera 40 may be a stereo camera including a plurality of cameras.

It should be noted that the configuration illustrated in FIG. 1 is merely an example, and a part of the configuration may be omitted or other components may be added.

Figure 2:
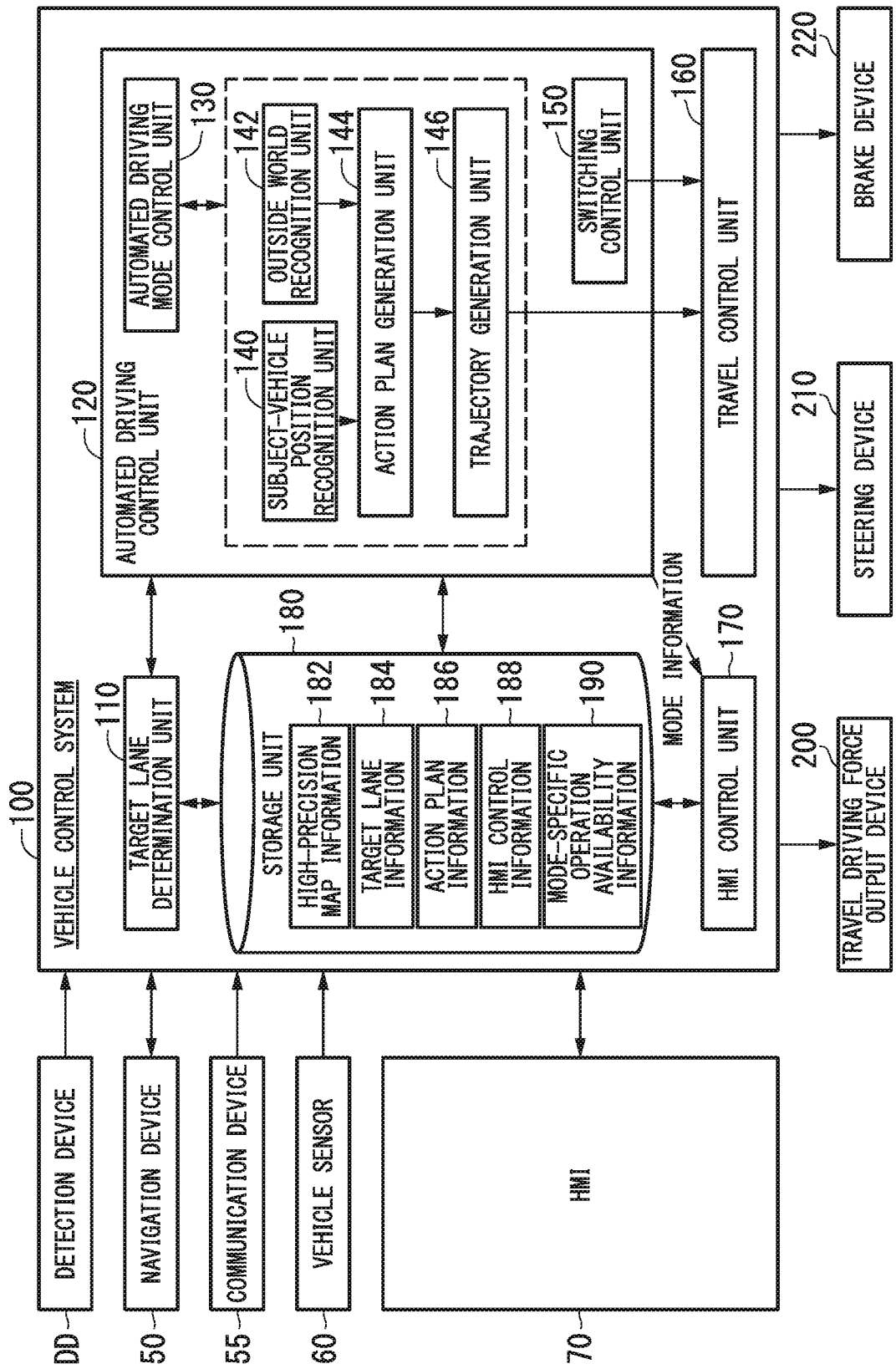
FIG. 2 is a functional configuration diagram centered on a vehicle control system 100.

FIG. 2 is a functional configuration diagram centered on the vehicle control system 100. A detection device DD including a finder 20, a radar 30, a camera 40, and the like, a navigation device 50, a communication device 55, a vehicle sensor 60, a human machine interface (HMI) 70, a vehicle control system 100, a travel driving force output device 200, a steering device 210, and a brake device 220 are mounted on the subject vehicle M. These devices or instruments are connected to each other by a multiplex communication line such as a controller area network (CAN) communication line, a serial communication line, or a wireless communication network. It should be noted that a vehicle control system in the claims does not refer only to the "vehicle control system 100" and may include configurations (a detection device DD, the HMI 70, or the like) other than the vehicle control system 100.

The navigation device 50 includes a global navigation satellite system (GNSS) receiver or map information (navigation map), a touch panel type display device functioning as a user interface, a speaker, a microphone, and the like. The navigation device 50 specifies a position of the subject vehicle M using the GNSS receiver and derives a route from the position to a destination designated by the user. The route derived by the navigation device 50 is provided to the target lane determination unit 110 of the vehicle control system 100. The position of the subject vehicle M may be specified or supplemented by an inertial navigation system (INS) using the output of the vehicle sensor 60. Further, when the vehicle control system 100 is executing a manual driving mode, the navigation device 50 performs guidance through speech or a navigation display for the route to the destination. It should be noted that a configuration for specifying the position of the subject vehicle M may be provided independently of the navigation device 50. Further, the navigation device 50 may be realized, for example, by a function of a terminal device such as a smartphone or a tablet terminal possessed by the user. In this case, transmission and reception of information is performed between the terminal device and the vehicle control system 100 through wireless or wired communication.

The communication device 55 performs wireless communication using, for example, a cellular network, a Wi-Fi network, Bluetooth (registered trademark), dedicated short range communication (DSRC), or the like. The communication device 55 can acquire, for example, traffic information (for example, congestion information), weather information, and the like from an external device, which is connected thereto through wireless communication.

The vehicle sensors 60 include, for example, a vehicle speed sensor that detects a vehicle speed (a traveling speed), an acceleration sensor that detects an acceleration, a yaw rate sensor that detects an angular velocity around a vertical axis, and a direction sensor that detects a direction of the subject vehicle M.

Figure 3:
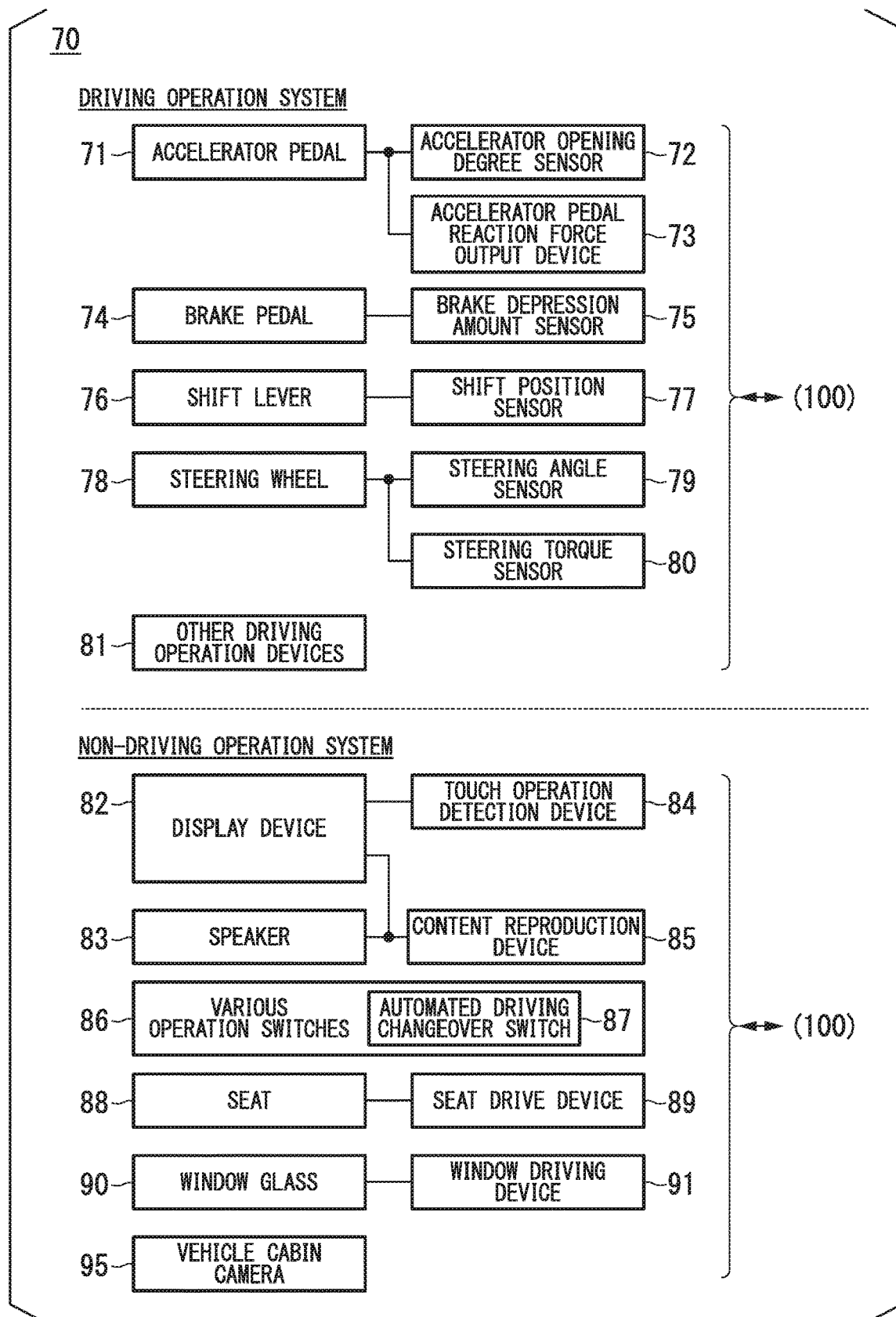
FIG. 3 is a configuration diagram of an HMI 70.

FIG. 3 is a configuration diagram of the HMI 70. The HMI 70 includes, for example, a configuration of a driving operation system and a configuration of a non-driving operation system. A boundary therebetween is not strictly defined, and the configuration of the driving operation system may have a function of the non-driving operation system (or vice versa). Further, these driving operation systems are examples of an operation reception unit that receives an operation of a vehicle occupant (occupant) of the subject vehicle M. Further, the non-driving operation system includes an interface device.

The HMI 70 includes, for example, an accelerator pedal 71, an accelerator opening sensor 72, an accelerator pedal reaction force output device 73, a brake pedal 74, a brake depression amount sensor (or a master pressure sensor or the like) 75, a shift lever 76, a shift position sensor 77, a steering wheel 78, a steering angle sensor 79, a steering torque sensor 80, and other driving operation devices 81 as the configuration of the driving operation system.

The accelerator pedal 71 is an operator for receiving an acceleration instruction from the vehicle occupant (or a deceleration instruction according to a return operation). The accelerator opening sensor 72 detects the amount of depression of the accelerator pedal 71 and outputs an accelerator opening signal indicating the amount of depression to the vehicle control system 100. It should be noted that the accelerator opening sensor 72 may directly output the accelerator opening signal to the travel driving force output device 200, the steering device 210, or the brake device 220 instead of outputting the accelerator opening signal to the vehicle control system 100. The same applies to configurations of other driving operation systems to be described below. The accelerator pedal reaction force output device 73 outputs a force (an operation reaction force) in a direction opposite to an operation direction with respect to the accelerator pedal 71 in response to an instruction from the vehicle control system 100, for example.

The brake pedal 74 is an operator for receiving a deceleration instruction from the vehicle occupant. The brake depression amount sensor 75 detects the amount of depression (or a depression force) of the brake pedal 74 and outputs a brake signal indicating a detection result to the vehicle control system 100.

The shift lever 76 is an operator for receiving an instruction to change a shift stage from the vehicle occupant. The shift position sensor 77 detects a shift stage instructed by the vehicle occupant and outputs a shift position signal indicating a detection result to the vehicle control system 100.

The steering wheel 78 is an operator for receiving a turning instruction from the vehicle occupant. The steering angle sensor 79 detects a steering angle of the steering wheel 78 and outputs a steering angle signal indicating a detection result to the vehicle control system 100. The steering torque sensor 80 detects a torque applied to the steering wheel 78 and outputs a steering torque signal indicating a detection result to the vehicle control system 100. It should be noted that, for control regarding the steering wheel 78, an operation reaction force may be output to the steering wheel 78, for example, by outputting a torque to a steering shaft using a reaction force motor or the like.

The other driving operation devices 81 are, for example, a joystick, a button, a dial switch, and a graphical user interface (GUI) switch. The other driving operation devices 81 receive an acceleration instruction, a deceleration instruction, a turning instruction and the like, and output the instructions to the vehicle control system 100.

The HMI 70 includes, for example, a display device (display unit) 82, a speaker 83, a touch operation detection device 84, a content reproduction device 85, various operation switches 86, a seat 88, a seat driving device 89, a window glass 90, a window driving device 91, and an vehicle cabin camera (an imaging unit) 95 as the configuration of the non-driving operation system.

The display device 82 is, for example, a liquid crystal display (LCD) or an organic electroluminescence (EL) display device attached to each unit of an instrument panel, or an arbitrary place facing a passenger seat or a rear seat. Further, the display device 82 may be a head up display (HUD) that projects an image to a front windshield or another window. The speaker 83 outputs sound. When the display device 82 is a touch panel, the touch operation detection device 84 detects a contact position (a touch position) on a display screen of the display device 82 and outputs the contact position to the vehicle control system 100. When the display device 82 is not a touch panel, the touch operation detection device 84 may be omitted.

Examples of the content reproduction device 85 include a digital versatile disc (DVD) reproduction device, a compact disc (CD) reproduction device, a television receiver, and various guidance image generation devices. Some or all of the display device 82, the speaker 83, the touch operation detection device 84, and the content reproduction device 85 may be configured to be shared by the navigation device 50. The display device 82, the speaker 83, the content reproduction device 85, and the navigation device 50 described above are all examples of the interface device, but the present invention is not limited thereto.

The various operation switches 86 are disposed at arbitrary places inside a vehicle cabin. The various operation switches 86 include an automated driving changeover switch 87 for instructing starting (or future starting) and stopping of automated driving. The automated driving changeover switch 87 may be any one of a graphical user interface (GUI) switch and a mechanical switch. Further, the various operation switches 86 may include a switch for driving the seat driving device 89 or the window driving device 91.

The seat 88 is a seat on which the vehicle occupant is seated. The seat driving device 89 freely drives a reclining angle, a position in a forward and backward direction, a yaw angle, or the like of the seat 88. The window glass 90 is provided, for example, in each door. The window driving device 91 drives the window glass 90 to open and close the window glass 90.

The vehicle cabin camera 95 is a digital camera using an individual imaging element such as a CCD or a CMOS. The vehicle cabin camera 95 is attached at a position at which at least a head (including a face) of the vehicle occupant who performs a driving operation can be imaged, such as a rearview mirror, a steering boss portion, or the instrument panel. The vehicle cabin camera 95, for example, periodically repeatedly images the vehicle occupant.

The travel driving force output device 200, the steering device 210, and the brake device 220 will be described before the vehicle control system 100 is described.

The travel driving force output device 200 outputs a travel driving force (torque) for causing the vehicle to travel to a driving wheel. The travel driving force output device 200, for example, includes an engine, a transmission, and an engine electronic control unit (ECU) that controls the engine in a case in which the subject vehicle M is a car using an internal combustion engine as a power source, includes a traveling motor and a motor ECU that controls the traveling motor in a case in which the subject vehicle M is an electric car using an electric motor as a power source, and includes an engine, a transmission, an engine ECU, a traveling motor, and a motor ECU in a case in which the subject vehicle M is a hybrid vehicle. In a case in which the travel driving force output device 200 includes only an engine, the engine ECU adjusts a throttle opening of engine, a gear shift stage, and the like according to information input from a travel control unit 160 to be described below. Further, when the travel driving force output device 200 includes only a traveling motor, the motor ECU adjusts a duty ratio of a PWM signal to be given to the traveling motor according to the information input from the travel control unit 160. When the travel driving force output device 200 includes an engine and a traveling motor, the engine ECU and the motor ECU cooperate with each other to control the travel driving force according to the information input from the travel control unit 160.

The steering device 210 includes, for example, a steering ECU and an electric motor. The electric motor, for example, changes a direction of the steerable wheels by applying a force to a rack and pinion mechanism. The steering ECU drives the electric motor according to information input from the vehicle control system 100 or input information on the steering angle or the steering torque, to change directions of the steerable wheels.

The brake device 220 is, for example, an electric servo brake device including a brake caliper, a cylinder that transfers hydraulic pressure to the brake caliper, an electric motor that generates the hydraulic pressure in the cylinder, and a brake control unit. The brake control unit of the electric servo brake device controls the electric motor according to the information input from the travel control unit 160 so that a brake torque according to the braking operation is output to each wheel. The electric servo brake device may include, as a backup, a mechanism for transferring the hydraulic pressure generated by the operation of the brake pedal to the cylinder via a master cylinder. It should be noted that the brake device 220 is not limited to the electric servo brake device described above and may be an electronically controlled hydraulic brake device. The electronically controlled hydraulic brake device controls an actuator according to the information input from the travel control unit 160 and transfers the hydraulic pressure of the master cylinder to the cylinder. Further, the brake device 220 may include a regenerative brake using a traveling motor that may be included in the travel driving force output device 200.

[Vehicle Control System]

Hereinafter, the vehicle control system 100 will be described. The vehicle control system 100 is realized by, for example, one or more processors or hardware having equivalent functions. The vehicle control system 100 may have a configuration in which, for example, a processor such as a central processing unit (CPU), a storage device, an electronic control unit (ECU) having a communication interface connected by an internal bus, and a micro-processing unit (MPU) are combined.

Referring back to FIG. 2, the vehicle control system 100 includes, for example, the target lane determination unit 110, an automated driving control unit 120, a travel control unit 160, an HMI control unit 170, and a storage unit 180. The automated driving control unit 120 includes, for example, an automated driving mode control unit 130, a subject-vehicle position recognition unit 140, an outside world recognition unit 142, an action plan generation unit 144, a trajectory generation unit 146, and a switching control unit 150. Some or all of each of the target lane determination unit 110, each unit of the automated driving control unit 120, and the travel control unit 160 are realized by the processor executing a program (software). Further, some or all of the units may be realized by hardware such as a large scale integration (LSI) or an application specific integrated circuit (ASIC) or may be realized in a combination of software and hardware.

Information such as high-precision map information 182, target lane information 184, action plan information 186, HMI control information 188, and mode-specific operation availability information 190, for example, is stored in the storage unit 180. The storage unit 180 is realized by a read only memory (ROM), a random access memory (RAM), a hard disk drive (HDD), a flash memory, or the like. The program to be executed by the processor may be stored in the storage unit 180 in advance or may be downloaded from an external device via an in-vehicle Internet facility or the like. Further, the program may be installed in the storage unit 180 by a portable storage medium having the program stored therein being mounted on a drive device (not illustrated). Further, a computer (an in-vehicle computer) of the vehicle control system 100 may be distributed by a plurality of computer devices.

The target lane determination unit 110 is realized by, for example, an MPU. The target lane determination unit 110 divides the route provided from the navigation device 50 into a plurality of blocks (for example, divides a route every 100 [m] in a vehicle traveling direction), and determines the target lane for each block by referring to the high-precision map information 182. The target lane determination unit 110, for example, determines the lane from the left in which the subject vehicle is traveling. The target lane determination unit 110 determines, for example, the target lane so that the subject vehicle M can travel on a reasonable traveling route for traveling to a branch destination when a branch place or a merging place exists in the route. The target lane determined by the target lane determination unit 110 is stored in the storage unit 180 as the target lane information 184.

The high-precision map information 182 is map information with higher precision than that of the navigation map included in the navigation device 50. The high-precision map information 182 is, for example, information on a center of a lane or information on boundaries of a lane. The high-precision map information 182 may include road information, traffic regulations information, address information (address and postal code), facilities information, telephone number information, and the like. The road information includes information indicating types of road such as expressways, toll roads, national highways, and prefectural roads, or information such as the number of lanes on a road, a width of respective lanes, a gradient of a road, a position of a road (three-dimensional coordinates including a longitude, a latitude, and a height), a curvature of a curve of a lane, a position of a merging or branching point of a lane, and a sign provided on a road. The traffic regulations information includes information such as lane closures due to roadwork, traffic accidents, traffic jams, or the like.

The automated driving control unit 120 automatically controls at least one of acceleration/deceleration and steering of the subject vehicle M so that the subject vehicle M travels along a route to the destination. Further, the automated driving control unit 120 performs automated driving control in one of a plurality of modes having different degrees of automated driving. It should be noted that the degree of automated driving is, for example, one or both of a degree of surroundings monitoring obligation required of the vehicle occupant of the subject vehicle M and a degree of tolerance of an operation with respect to each interface device of the HMI 70 which receives an operation of the vehicle occupant and outputs information.

The automated driving mode control unit 130 determines an automated driving mode to be executed by the automated driving control unit 120. The automated driving mode in the first embodiment includes the following modes. It should be noted that the following is merely an example, and the number of automated driving modes or the content of the mode may be arbitrarily determined.

[First Mode]

A first mode is a mode in which a degree of automated driving is higher than those of other modes. When the first mode is performed, all vehicle controls such as complicated merging control are automatically performed, and therefore, the vehicle occupant does not have to monitor surroundings or a state of the subject vehicle M (there is no obligation to monitor surroundings, which is required for the vehicle occupant).

Here, an example of the first mode includes, for example, a congestion following mode (low speed following mode) in which the subject vehicle follows a preceding vehicle at the time of congestion. In the first mode, safe automated driving can be realized by following a preceding vehicle on a congested highway, for example, as a traffic jam pilot (TJP), and the TJP ends when the congestion is resolved. For example, when a traveling speed of the subject vehicle M becomes equal to or higher than a predetermined speed (for example, 40 km/h or more), it is possible to determine that the congestion has been resolved, but the present invention is not limited thereto. For example, it may be detected that the congestion has been resolved by receiving traffic information (congestion information) from an external device using the communication device 55. Further, switching from the first mode to another mode may occur at a timing at which the TJP ends, but the mode may be switched after a predetermined time at which the TJP ends, or when a speed higher than a speed at which the TJP has ended is reached. It should be noted that the first mode is a mode in which the degree of operation tolerance of each interface device (a non-driving operation system) of the HMI 70 is higher than those of the other modes.

[Second Mode]

A second mode is a mode in which the degree of automated driving is high next to the first mode. When the second mode is performed, x all the vehicle controls is automatically performed in principle, but the driving operation of the subject vehicle M is entrusted to the vehicle occupant according to scenes. Therefore, it is necessary for the vehicle occupant to monitor the surroundings or state of the subject vehicle M (the surroundings monitoring obligation increases as compared to the first mode). It should be noted that the second mode is a mode in which the degree of operation tolerance of each interface device (a non-driving operation system) of the HMI 70 is lower than that of the first mode.

[Third Mode]

A third mode is a mode in which the degree of automated driving is high next to the second mode. When the third mode is performed, the vehicle occupant needs to perform a confirmation operation according to scenes with respect to the HMI 70. In the third mode, for example, the vehicle occupant is notified of a timing of a lane change, and when the vehicle occupant performs an operation for instructing to change the lane with respect to the HMI 70, automatic lane change is performed. Therefore, it is necessary for the vehicle occupant to monitor the surroundings or state of the subject vehicle M (the surroundings monitoring obligation increases as compared to the second mode). It should be noted that the third mode is a mode in which the degree of operation tolerance of each interface device (a non-driving operation system) of the HMI 70 is lower than that of the second mode.

The automated driving mode control unit 130 determines the automated driving mode (a driving mode) on the basis of an operation of the vehicle occupant with respect to the HMI 70, an event determined by the action plan generation unit 144, a traveling aspect determined by the trajectory generation unit 146, and the like. It should be noted that the driving mode may include a manual driving mode. Further, the HMI control unit 170 is notified of the determined automated driving mode (mode information). Further, in the automated driving mode, a limit may be set according to the performance or the like of the detection device DD of the subject vehicle M. For example, when the performance of the detection device DD is low, the first mode may not be performed.

In any of the automated driving modes, switching to the manual driving mode (overriding) can be performed according to an operation with respect to the configuration of the driving operation system in the HMI 70. The overriding is started, for example, when the operation with respect to the driving operation system of the HMI 70 continues for a predetermined time or more by the vehicle occupant of the subject vehicle M, when the amount of operation change is equal to or larger than the predetermined amount of operation change (for example, the accelerator opening of the accelerator pedal 71, the brake depression amount of the brake pedal 74, or the steering angle of the steering wheel 78), or when the operation with respect to the driving operation system has been performed a predetermined number of times or more.

The subject-vehicle position recognition unit 140 of the automated driving control unit 120 recognizes a lane (traveling lane) in which the subject vehicle M is traveling, and a relative position of the subject vehicle M with respect to the traveling lane, on the basis of the high-precision map information 182 stored in the storage unit 180, and information input from the finder 20, the radar 30, the camera 40, the navigation device 50, or the vehicle sensor 60.

The subject-vehicle position recognition unit 140 compares, for example, a pattern of a road division line (for example, an arrangement of a solid line and a broken line) recognized from the high-precision map information 182 with a pattern of a road division line around the subject vehicle M recognized from an image captured by the camera 40 to recognize the traveling lane. In this recognition, the position of the subject vehicle M acquired from the navigation device 50 or a processing result by an INS may be added.

Figure 4:
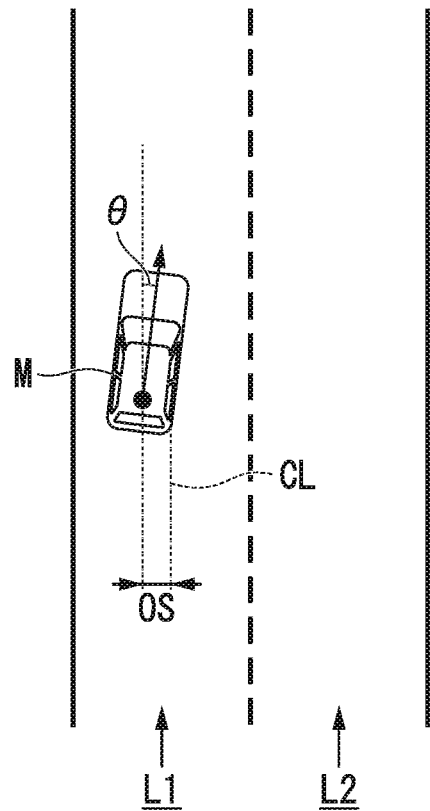
FIG. 4 is a diagram illustrating a state in which a relative position of a subject vehicle M with respect to a travel lane L1 is recognized by a subject-vehicle position recognition unit 140.

FIG. 4 is a diagram illustrating a state in which the relative position of the subject vehicle M with respect to the travel lane L1 is recognized by the subject-vehicle position recognition unit 140. The subject-vehicle position recognition unit 140, for example, may recognize a deviation OS of a reference point (for example, a centroid) of the subject vehicle M from a travel lane center CL, and an angle θ with respect to a connecting line along the travel lane center CL in the travel direction of the subject vehicle M, as the relative position of the subject vehicle M with respect to a travel lane L1. It should be noted that, instead of this, the subject-vehicle position recognition unit 140 may recognize, for example, the position of the reference point of the subject vehicle M with respect to any one side end portion of the subject lane L1 as the relative position of the subject vehicle M with respect to the travel lane. The relative position of the subject vehicle M recognized by the subject-vehicle position recognition unit 140 is provided to the action plan generation unit 144.

The outside world recognition unit 142 recognizes a state such as a position, a speed, and an acceleration of a nearby vehicle on the basis of information input from the finder 20, the radar 30, the camera 40, and the like. The nearby vehicle is, for example, a vehicle that is traveling nearby the subject vehicle M and is a vehicle that travels in the same direction as that of the subject vehicle M. The position of the nearby vehicle may be represented by a representative point such as a centroid or a corner of another vehicle or may be represented by an area represented by an outline of another vehicle. The "state" of the nearby vehicle may include an acceleration of the nearby vehicle, and an indication of whether or not the nearby vehicle is changing lane (or whether or not the nearby vehicle is about to change lane), which are ascertained on the basis of the information of the various devices described above. Further, the outside world recognition unit 142 may also recognize positions of a guardrail, a utility pole, a parked vehicle, a pedestrian, and other objects, in addition to nearby vehicles.

The action plan generation unit 144 sets a starting point of automated driving and/or a destination for automated driving. The starting point of automated driving may be a current position of the subject vehicle M or may be a point at which an operation for instructing automated driving is performed. The action plan generation unit 144 generates the action plan in a section between the starting point and the destination of automated driving. It should be noted that the present invention is not limited thereto, and the action plan generation unit 144 may generate the action plan for any section.

The action plan includes, for example, a plurality of events that are executed sequentially. Examples of the events include a deceleration event for decelerating the subject vehicle M, an acceleration event for accelerating the subject vehicle M, a lane keeping event for causing the subject vehicle M to travel so that the subject vehicle M does not deviate from a travel lane, a lane change event for changing travel lane, an overtaking event for causing the subject vehicle M to overtake a preceding vehicle, a branching event for changing a lane to a desired lane at a branch point or causing the subject vehicle M to travel so that the subject vehicle M does not deviate from a current travel lane, a merging event for accelerating and decelerating the subject vehicle M at a merging lane for merging into a main lane and changing travel lane, and a handover event for shifting the driving mode from the manual driving mode to the automated driving mode at a start point of the automated driving or shifting the driving mode from the automated driving mode to the manual driving mode at a scheduled end point of the automated driving. The action plan generation unit 144 sets a lane change event, a branching event, or a merging event at a place at which the target lane determined by the target lane determination unit 110 is switched. Information indicating the action plan generated by the action plan generation unit 144 is stored in the storage unit 180 as action plan information 186.

Figure 5:
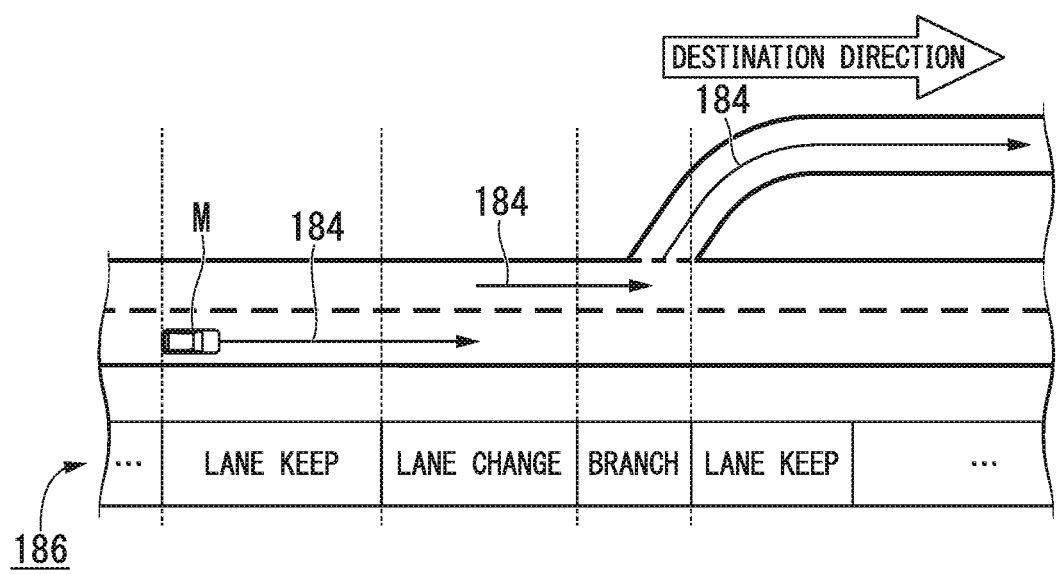
FIG. 5 is a diagram illustrating an example of an action plan generated for a certain section.

FIG. 5 is a diagram illustrating an example of an action plan generated for a certain section. As illustrated in FIG. 5, the action plan generation unit 144 generates an action plan necessary for the subject vehicle M to travel on the target lane indicated by the target lane information 184. It should be noted that the action plan generation unit 144 may dynamically change the action plan irrespective of the target lane information 184 according to a situation change of the subject vehicle M. For example, when a speed of the nearby vehicle recognized by the outside world recognition unit 142 exceeds a threshold value during vehicle traveling or a moving direction of the nearby vehicle traveling in the lane adjacent to the subject lane is directed to a direction of the subject lane, the action plan generation unit 144 may change an event set in a driving section in which the subject vehicle M is scheduled to travel. For example, in a case in which an event is set so that a lane change event is executed after a lane keeping event, when it has been found from a result of the recognition of the outside world recognition unit 142 that a vehicle travels at a speed equal to or higher than a threshold value from behind in a lane that is a lane change destination during the lane keeping event, the action plan generation unit 144 may change an event subsequent to the lane keeping event from a lane change event to a deceleration event, a lane keeping event, or the like. As a result, even when a change occurs in a state of the outside world, the vehicle control system 100 can cause the subject vehicle M to safely automatically travel.

Figure 6:
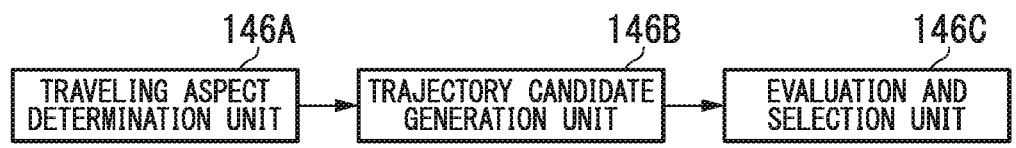
FIG. 6 is a diagram illustrating an example of a configuration of a trajectory generation unit 146.

FIG. 6 is a diagram illustrating an example of a configuration of the trajectory generation unit 146. The trajectory generation unit 146 includes, for example, a traveling aspect determination unit 146A, a trajectory candidate generation unit 146B, and an evaluation and selection unit 146C.

When a lane keeping event is performed, the traveling aspect determination unit 146A determines, for example, a traveling aspect of any one of constant speed traveling, following traveling, low speed following traveling, decelerating traveling, curved traveling, obstacle avoidance traveling, and the like. For example, when there are no other vehicles in front of the subject vehicle M, the traveling aspect determination unit 146A determines the traveling aspect to be constant speed traveling. Further, when the vehicle follows the preceding vehicle, the traveling aspect determination unit 146A determines the traveling aspect to be following traveling. Further, the traveling aspect determination unit 146A determines the traveling aspect to be the low speed follow traveling in a congested situation or the like. Further, when the outside world recognition unit 142 recognizes deceleration of the preceding vehicle or when an event such as stopping or parking is performed, the traveling aspect determination unit 146A determines the traveling aspect to be decelerating traveling. Further, when the outside world recognition unit 142 recognizes that the subject vehicle M has arrived at a curved road, the traveling aspect determination unit 146A determines the traveling aspect to be curved traveling. Further, when an obstacle is recognized in front of the subject vehicle M by the outside world recognition unit 142, the traveling aspect determination unit 146A determines the traveling aspect to be the obstacle avoidance traveling.

Figure 7:
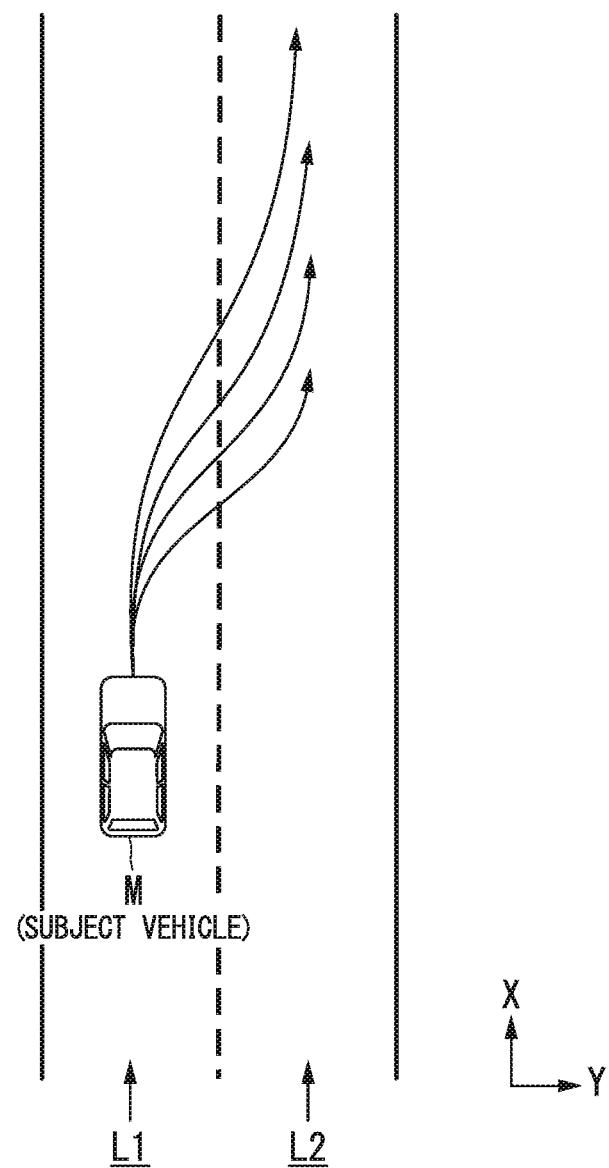
FIG. 7 is a diagram illustrating an example of trajectory candidates generated by a trajectory candidate generation unit 146B.

The trajectory candidate generation unit 146B generates candidates for the trajectory on the basis of the traveling aspect determined by the traveling aspect determination unit 146A. FIG. 7 is a diagram illustrating an example of candidates for the trajectory generated by the trajectory candidate generation unit 146B. FIG. 7 illustrates candidates for the trajectory generated when the subject vehicle M changes the lane from the lane L1 to the lane L2.

Figure 8:
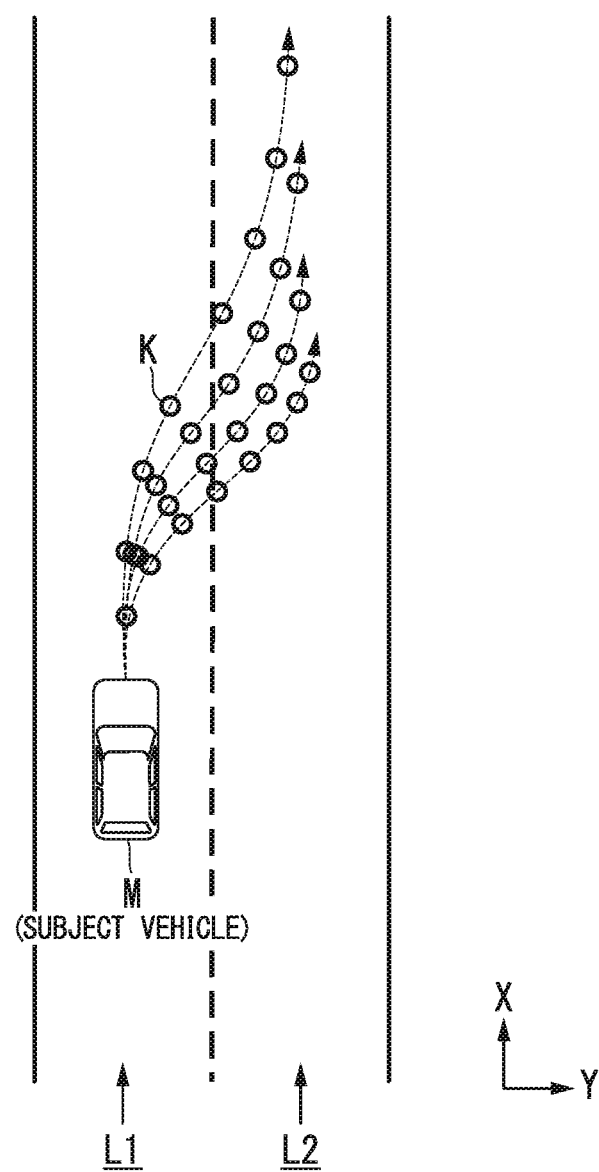
FIG. 8 is a diagram in which the trajectory candidates generated by the trajectory candidate generation unit 146B are expressed as trajectory points K.

The trajectory candidate generation unit 146B determines the trajectory as illustrated in FIG. 7, for example, to be a collection of the target positions (the trajectory points K) that the reference position (for example, a centroid or a rear wheel shaft center) of the subject vehicle M should reach at every predetermined time in the future. FIG. 8 is a diagram in which the candidate for the trajectory generated by the trajectory candidate generation unit 146B is represented by the trajectory points K. When an interval between the trajectory points K is wider, the speed of the subject vehicle M becomes higher, and when the interval between the trajectory points K is narrower, the speed of the subject vehicle M becomes lower. Therefore, the trajectory candidate generation unit 146B gradually widens the interval between the trajectory points K when acceleration is desired, and gradually narrows the interval between the trajectory points when deceleration is desired.

Thus, since the trajectory point K includes a speed component, the trajectory candidate generation unit 146B needs to give a target speed to each trajectory point K. The target speed is determined according to the traveling aspect determined by the traveling aspect determination unit 146A.

A scheme of determining the target speed when lane change (including branching) is performed will be described herein. The trajectory candidate generation unit 146B first sets a lane changing target position (or a merging target position). The lane changing target position is set as a relative position with respect to the nearby vehicle and is used for a determination as to "whether the lane change is performed between the subject vehicle and a certain nearby vehicle". The trajectory candidate generation unit 146B determines the target speed when the lane change is performed while focusing on three nearby vehicles with reference to the lane changing target position.

Figure 9:
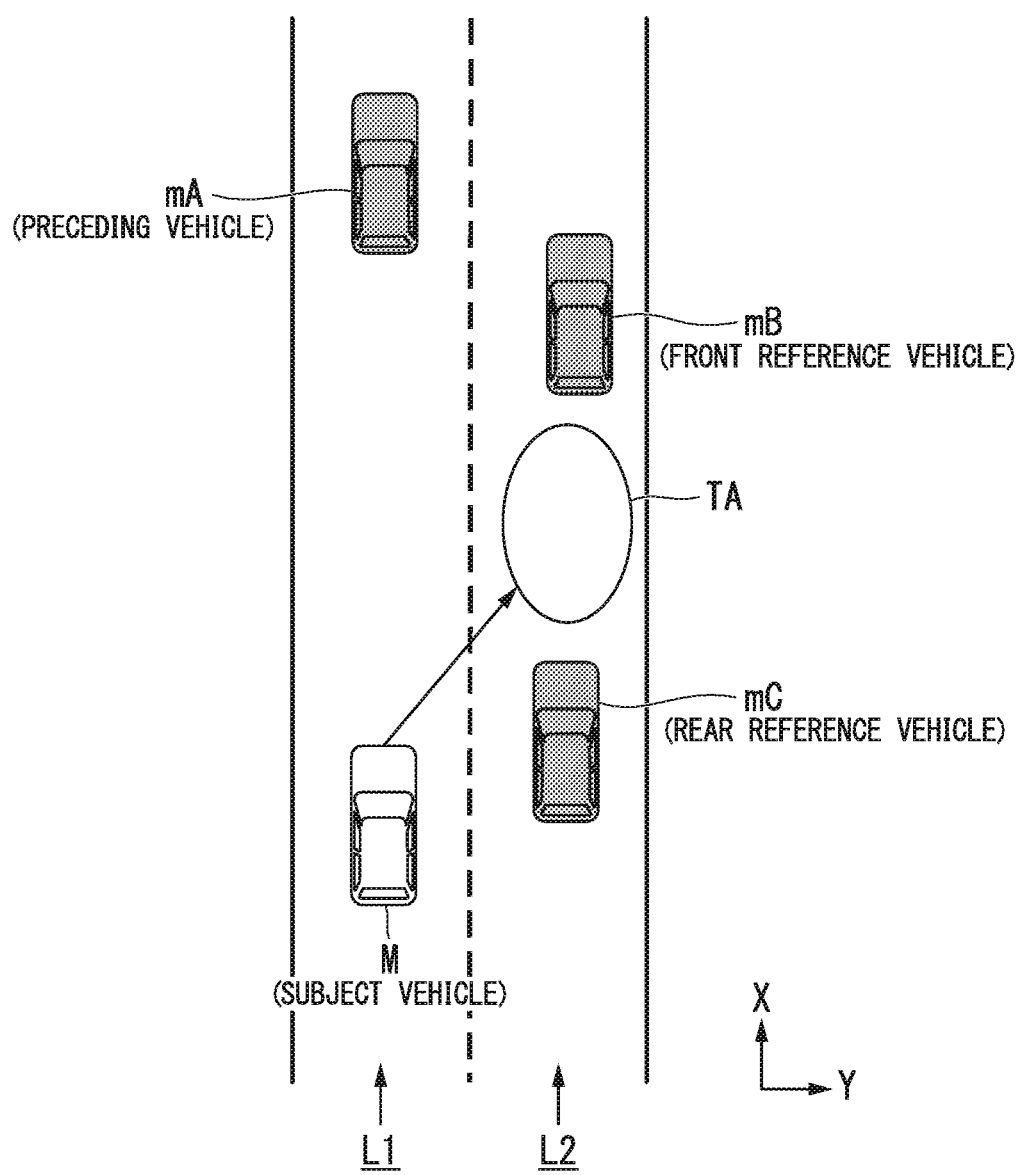
FIG. 9 is a diagram illustrating a lane changing target position TA.

FIG. 9 is a diagram illustrating the lane changing target position TA. In FIG. 9, L1 indicates the subject lane, and L2 indicates an adjacent lane. Here, a nearby vehicle traveling in front of the subject vehicle M on the same lane as that of the subject vehicle M is referred to as a preceding vehicle mA, a nearby vehicle traveling immediately before the lane changing target position TA is referred to as a front reference vehicle mB, and a nearby vehicle traveling immediately after the lane changing target position TA is referred to as a rear reference vehicle mC. The subject vehicle M needs to perform acceleration or deceleration in order to move to the side of the lane changing target position TA, but should avoid catching up with the preceding vehicle mA in this case. Therefore, the trajectory candidate generation unit 146B predicts a future state of the three nearby vehicles and determines a target speed so that the subject vehicle M does not interfere with each nearby vehicle.

Figure 10:
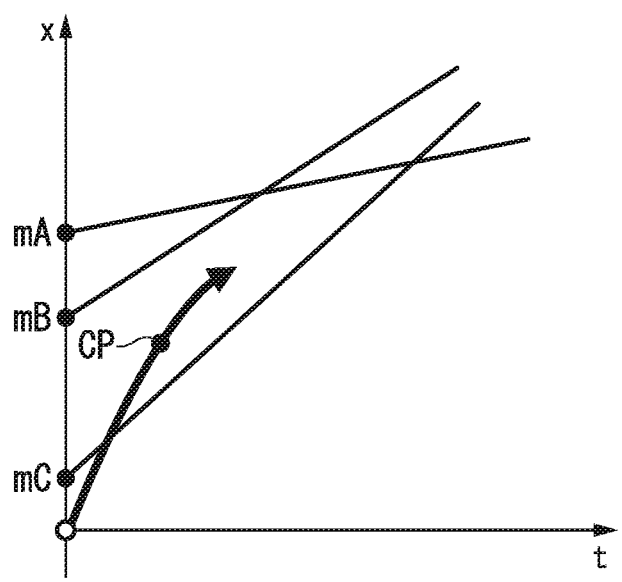
FIG. 10 is a diagram illustrating a speed generation model when speeds of three nearby vehicles are assumed to be constant.

FIG. 10 is a diagram illustrating a speed generation model when speeds of three nearby vehicles are assumed to be constant. In FIG. 10, straight lines extending from mA, mB, and mC indicate displacements in the traveling direction when each nearby vehicle is assumed to travel at a constant speed. The subject vehicle M should be between the front reference vehicle mB and the rear reference vehicle mC at a point CP at which the lane change is completed and should be behind the preceding vehicle mA before that. Under such restrictions, the trajectory candidate generation unit 146B derives a plurality of time-series patterns of the target speed until the lane change is completed. The trajectory candidate generation unit 146B derives a plurality of trajectory candidates as illustrated in FIG. 7 described above applying the time-series patterns of the target speed to a model such as a spline curve. It should be noted that a motion pattern of the three nearby vehicles is not limited to the constant speed as illustrated in FIG. 9, but the prediction may be performed on the premise of constant acceleration and constant jerk.

The evaluation and selection unit 146C performs evaluation on the trajectory candidates generated by the trajectory candidate generation unit 146B, for example, from two viewpoints including planning and safety, and selects a trajectory to be output to the travel control unit 160. From the viewpoint of the planning, for example, when follow-up with respect to an already generated plan (for example, the action plan) is high and a total length of the trajectory is short, the trajectory obtains high evaluation. For example, a trajectory in which the lane is changed to the left direction and then returning is required when the lane is desired to be changed to the right obtains a low evaluation. From the viewpoint of the safety, for example, as a distance between the subject vehicle M and an object (a nearby vehicle or the like) is longer at each trajectory point and the amount of change in acceleration and deceleration or steering angle is smaller, high evaluation is obtained.

The switching control unit 150 switches the driving mode between the automated driving mode and the manual driving mode on the basis of the signal input from the automated driving changeover switch 87. Further, the switching control unit 150 switches driving mode from the automated driving mode to the manual driving mode on the basis of an operation for instructing acceleration/deceleration or steering with respect to a configuration of the driving operation system in the HMI 70. For example, the switching control unit 150 switches the driving mode from the automated driving mode to the manual driving mode when a state in which the amount of operation indicated by the signal input from the configuration of the driving operation system in the HMI 70 exceeds a threshold value continues for a reference time or more (overriding). It should be noted that the switching control unit 150 may cause the driving mode to return to the automated driving mode when no operation with respect to the configuration of the driving operation system in the HMI 70 is detected for a predetermined time after switching to the manual driving mode by overriding. Further, when the switching control unit 150 performs handover control for a shift from the automated driving mode to the manual driving mode, for example, at a scheduled end point of the automated driving, the switching control unit 150 notifies the vehicle occupant of a handover request in advance, and accordingly, information indicating the fact is output to the HMI control unit 170.

The travel control unit 160 controls the travel driving force output device 200, the steering device 210, and the brake device 220 so that the subject vehicle M passes through the trajectory generated by the trajectory generation unit 146 at the scheduled time.

The HMI control unit 170 controls the HMI 70 on the basis of information on the driving mode that is obtained by the automated driving control unit 120. For example, the HMI control unit 170 controls whether or not the vehicle occupant can operate a non-driving operation system of the HMI 70, the navigation device 50, or the like on the basis of the driving mode. Further, the HMI control unit 170 causes predetermined information to be output on the interface device of the HMI 70 before a predetermined time and/or a predetermined speed at which the change to the automated driving mode in which the surroundings monitoring obligation of the vehicle occupant increases is performed.

Figure 11:
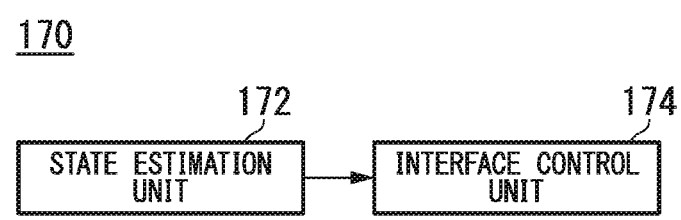
FIG. 11 is a diagram illustrating an example of a configuration of an HMI control unit 170.
Figure 12:
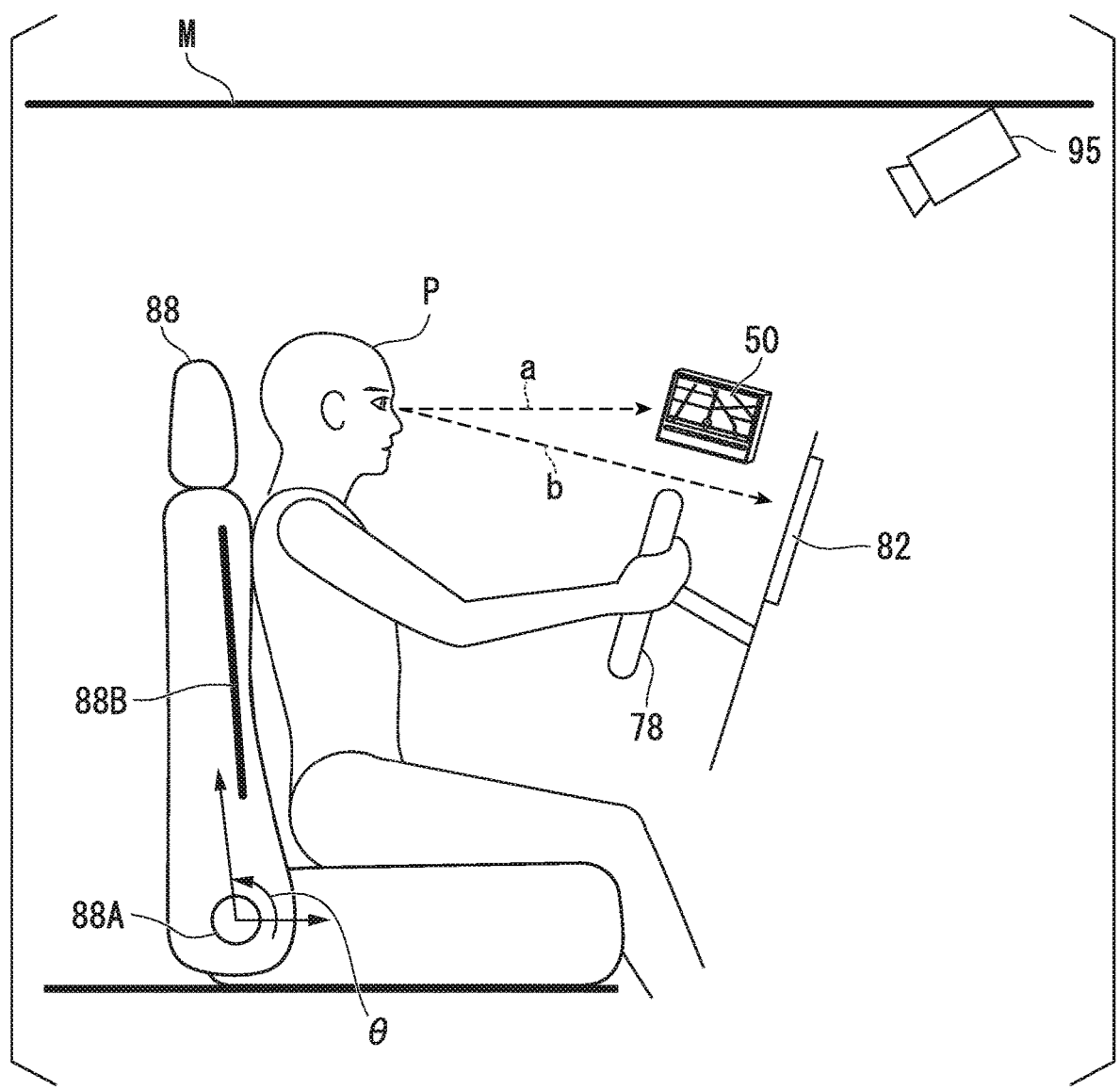
FIG. 12 is a diagram illustrating a state of a subject vehicle M for estimating a state of a vehicle occupant.

FIG. 11 is a diagram illustrating an example of a configuration of the HMI control unit 170. The HMI control unit 170 illustrated in FIG. 11 includes a state estimation unit 172 and an interface control unit 174. Further, FIG. 12 is a diagram illustrating a state of the subject vehicle M for estimating a state of the vehicle occupant.

The state estimation unit 172 estimates the state of the vehicle occupant using the HMI 70 or the like when the mode information acquired from the automated driving control unit 120 is a change to the driving mode in which output of information is required. For example, the state estimation unit 172 estimates a degree (a level value) of driving intention of the vehicle occupant on the basis of an image of the inside of the subject vehicle M captured by the vehicle cabin camera 95 and/or a detection result from the angle detection sensor 88A, the load sensor 88B, or the like provided on the seat 88, as illustrated in FIG. 12.

For example, when the state estimation unit 172 estimates the degree of driving intention of the vehicle occupant of the subject vehicle M from the image captured by the vehicle cabin camera 95, the state estimation unit 172 first specifies a position of a face of the vehicle occupant from shape information and/or luminance information included in the image. Then, the state estimation unit 172 estimates an opening and closing state of eyes from the position of the face of the vehicle occupant and estimates whether or not the vehicle occupant is asleep on the basis of a result of the estimation. For example, the state estimation unit 172 estimates that the vehicle occupant is asleep and also estimates that a driving intention level of the vehicle occupant is low when the state estimation unit 172 determines that the vehicle occupant is closing his or her eyes for several seconds or more (for example, 30 seconds or more). Further, when the vehicle occupant grips the steering wheel 78 from the image captured by the vehicle cabin camera 95, the state estimation unit 172 estimates that the driving intention level of the vehicle occupant is high.

Further, the state estimation unit 172 may estimate the state of the vehicle occupant according to a reclining angle $\theta$ between a seating portion and a backrest portion of the seat 88 detected by the angle detection sensor 88A and/or a load distribution in the load sensor 88B provided on the backrest portion of the seat 88. For example, the state estimation unit 172 estimates that the vehicle occupant is asleep and estimates that the driving intention level is low when the reclining angle $\theta$ between the seat portion and the backrest portion of the seat 88 is equal to or greater than a predetermined angle $\theta_{th}$ (for example, 120° or more). Further, when the load distribution obtained by the load sensor 88B is a predetermined distribution (for example, when the load distribution is similar to or the same as a load distribution when the vehicle occupant is asleep), the state estimation unit 172 estimates that the vehicle occupant is asleep and estimates that the driving intention level is low. The above-described driving intention level can be preset as a numerical value.

Here, FIG. 13 is a diagram illustrating an example of the HMI control information 188. In the example of FIG. 13, items of the HMI control information 188 include, for example, "estimated state of the vehicle occupant", "driving intention level (degree)", "notification start time", and "notification start speed", but the present invention is not limited thereto.

The "Estimated state of the vehicle occupant" is information indicating a state of the vehicle occupant estimated by the state estimation unit 172. In the example of FIG. 13, examples of the "estimated state of the vehicle occupant" include "asleep", "watching a DVD video", "operating the navigation device 50", "looking at a traveling direction of the subject vehicle M, and "griping the steering wheel 78". However, the present invention is not limited to thereto.

The "driving intention level (degree)" is a numerical value of the driving intention level that is set in correspondence to the estimated state of the vehicle occupant. The "notification start time" is, for example, information on a time when notification to the vehicle occupant is started by the HMI 70 in a case in which a shift to a mode in which the surroundings monitoring obligation increases for the vehicle occupant or a mode in which the degree of operation tolerance becomes low (for example, the second mode or the third mode described above) is assumed to be performed with a change of the automated driving mode of the subject vehicle M.

The "notification start speed" is, for example, information on a traveling speed of the subject vehicle M at which the notification to the vehicle occupant is started by the HMI 70 in a case in which a shift to the mode in which the surroundings monitoring obligation increases for the vehicle occupant or the mode in which the degree of operation tolerance becomes low is assumed to be performed with a change of the automated driving mode of the subject vehicle M. That is, the notification start time and the notification start speed are set according to the estimated state of the vehicle occupant or the state of the subject vehicle M.

It should be noted that each numerical value of the HMI control information 188 illustrated in FIG. 13 is not limited thereto. Further, the HMI control information 188 in this embodiment may include information on any one of the notification start time and the notification start speed described above. Further, the HMI control information 188 may be set for each vehicle occupant. The state estimation unit 172 determines a timing at which predetermined information or the like is caused to be output on the interface device according to the state of the vehicle occupant estimated by referring to the HMI control information 188. Information on the determined timing (for example, the notification start time and the notification start speed) is output to the interface control unit 174.

The interface control unit 174 receives the operation of the vehicle occupant of the subject vehicle M and restricts the operation with respect to the interface device on which predetermined information is output, according to the mode of automated driving performed by the automated driving control unit 120. For example, when the change to the mode of the automated driving in which the degree of automated driving decreases is performed in a state in which the restriction is relaxed or released, the interface control unit 174 causes the state of the interface device to return to a state before the restriction is relaxed or released before a predetermined time at which the change to the mode of the automated driving is performed. Further, the interface control unit 174 performs a predetermined notification before the predetermined time at which the change to the mode of the automated driving is performed.

For example, the interface control unit 174 causes predetermined information to be output on the interface device before the predetermined time at which the change to the mode of automated driving in which the surroundings monitoring obligation of the vehicle occupant increases is performed.

Further, when the change to the mode of the automated driving in which the degree of automated driving decreases is performed in a state in which the restriction is relaxed or released, the interface control unit 174 causes the state of the interface device to return to a state before the restriction is relaxed or released or performs a predetermined notification before a predetermined time at which the change to the mode of the automated driving is performed. For example, the interface control unit 174 performs a predetermined notification to the interface device before a predetermined time at which the change to the mode of automated driving in which the surroundings monitoring obligation of the vehicle occupant increases is performed. Further, the interface control unit 174 performs predetermined notification to the interface device before a predetermined time at which the degree of operation tolerance of the interface device decreases with the change of the mode of automated driving. Here, the above-described predetermined time is set, for example, according to the state of the vehicle occupant or the state of the subject vehicle.

Further, the interface control unit 174 determines whether or not the operation regarding the HMI 70 or the navigation device 50 can be performed on the basis of the mode information obtained from the automated driving control unit 120 and the mode-specific operation availability information 190 stored in the storage unit 180.

FIG. 14 is a diagram illustrating an example of the mode-specific operation availability information 190. The mode-specific operation availability information 190 illustrated in FIG. 14 includes a "manual driving mode" and an "automated driving mode" as items of the driving mode. Further, the "automated driving mode" includes, for example, the "first mode", the "second mode", the "third mode" described above. Further, the mode-specific operation availability information 190 includes, for example, a "navigation operation" that is an operation with respect to the navigation device 50, a "content reproduction operation" that is an operation with respect to the content reproduction device 85, and an "instrument panel operation" that is an operation with respect to the display device 82, as items of the non-driving operation system. In the example of the mode-specific operation availability information 190 illustrated in FIG. 14, whether or not the vehicle occupant can operate the non-driving operation system in each of the above-described driving modes is set, but the interface device that is a target is not limited thereto.

The interface control unit 174 determines an interface device (an operation system) of which the use is permitted due to relaxation or release of a restriction on use or the like and an interface device of which the use is not permitted due to the restriction, by referring to the mode-specific operation availability information 190 on the basis of the mode information (driving mode) acquired from the automated driving control unit 120. It should be noted that the use is, for example, one or both of reception of an operation of the vehicle occupant and output of information on the interface device. Further, the interface control unit 174 controls whether or not an operation with respect to the interface device of the non-driving operation system can be received from the vehicle occupant on the basis of a result of the determination.

For example, when the subject vehicle M is in the manual driving mode, the vehicle occupant operates the driving operation system (for example, the accelerator pedal 71, the brake pedal 74, the shift lever 76, and the steering wheel 78) of the HMI 70. Further, when the subject vehicle M is in the second mode, the third mode, or the like of the automated driving mode, the vehicle occupant has the surroundings monitoring obligation of the subject vehicle M. In such a case, in order to prevent attention from being distracted (driver distraction) due to an action (an operation or the like) other than driving of the vehicle occupant, the interface control unit 174 performs control so that an operation with respect to some or all of the non-driving operation system of the HMI 70 is not received.

Further, for example, when the driving mode transitions from the second mode of automated driving to the first mode, the interface control unit 174 relaxes a driver distraction restriction and performs control for receiving the operation of the vehicle occupant with respect to the non-driving operation system of which the operation has not been received. On the other hand, when the driving mode transitions from the first mode to the second mode or the third mode (when the change to the mode of automated driving in which the surroundings monitoring obligation of the vehicle occupant increases is performed), the interface control unit 174 performs a predetermined notification or the like to the interface device before the mode transitions on the basis of a timing of the notification start time or the notification start speed obtained by the state estimation unit 172 described above. It should be noted that the predetermined notification is, for example, information indicating that the change to the mode of automated driving is to be performed in the HMI 70 or a notification indicating that the state of the HMI 70 returns to the state before the restriction is relaxed or released. Further, the predetermined information to be notified is, for example, one or both of information indicating that the surroundings monitoring obligation increases and information indicating that the degree of operation tolerance with respect to the interface device is low (the operation is restricted, but the present invention is not limited thereto. The predetermined information may be, for example, information for prompting preparation for handover control.

Further, the interface control unit 174 may select and display the interface device (the HMI 70) that is a target to which information is to output, on the basis of a line-of-sight detection result of the vehicle occupant. As a line-of-sight detection scheme, for example, a position of an edge of an eyelid and a position of an iris of the vehicle occupant are detected on the basis of feature information such as a luminance and a shape of the image captured by the vehicle cabin camera 95, and the line-of-sight direction can be detected from a positional relationship between the edge of the eyelid and the iris. It should be noted that the line-of-sight detection scheme is not limited to the example described above.

For example, when the line-of-sight direction of the vehicle occupant P is a direction to the navigation device 50 (an arrow a illustrated in FIG. 12) as illustrated in FIG. 12 described above, the interface control unit 174 causes, for example, information indicating that the vehicle occupant P has the surroundings monitoring obligation to be output on a screen of the navigation device 50. Further, when the line-of-sight direction of the vehicle occupant P is a direction to the display device 82 such as the instrument panel (an arrow b in FIG. 12), the interface control unit 174 causes information indicating that the vehicle occupant P has the surroundings monitoring obligation to be output on a screen of the display device 82. It should be noted that the interface control unit 174 may perform notification control on one or more preset HMIs 70 regardless of the line-of-sight direction of the vehicle occupant P.

As described above, for example, the HMI control unit 170 outputs a warning or the like to the vehicle occupant before the predetermined time at which the driving mode transitions from the first mode described above to the second mode or the third mode or before the subject vehicle M reaches the predetermined speed, such that the vehicle occupant can be notified of shifting of, for example, the surroundings monitoring obligation of the subject vehicle M to the vehicle occupant at an appropriate timing before shifting. Therefore, it is possible to give a period of preparation for switching of automated driving to the vehicle occupant.

Figure 15:
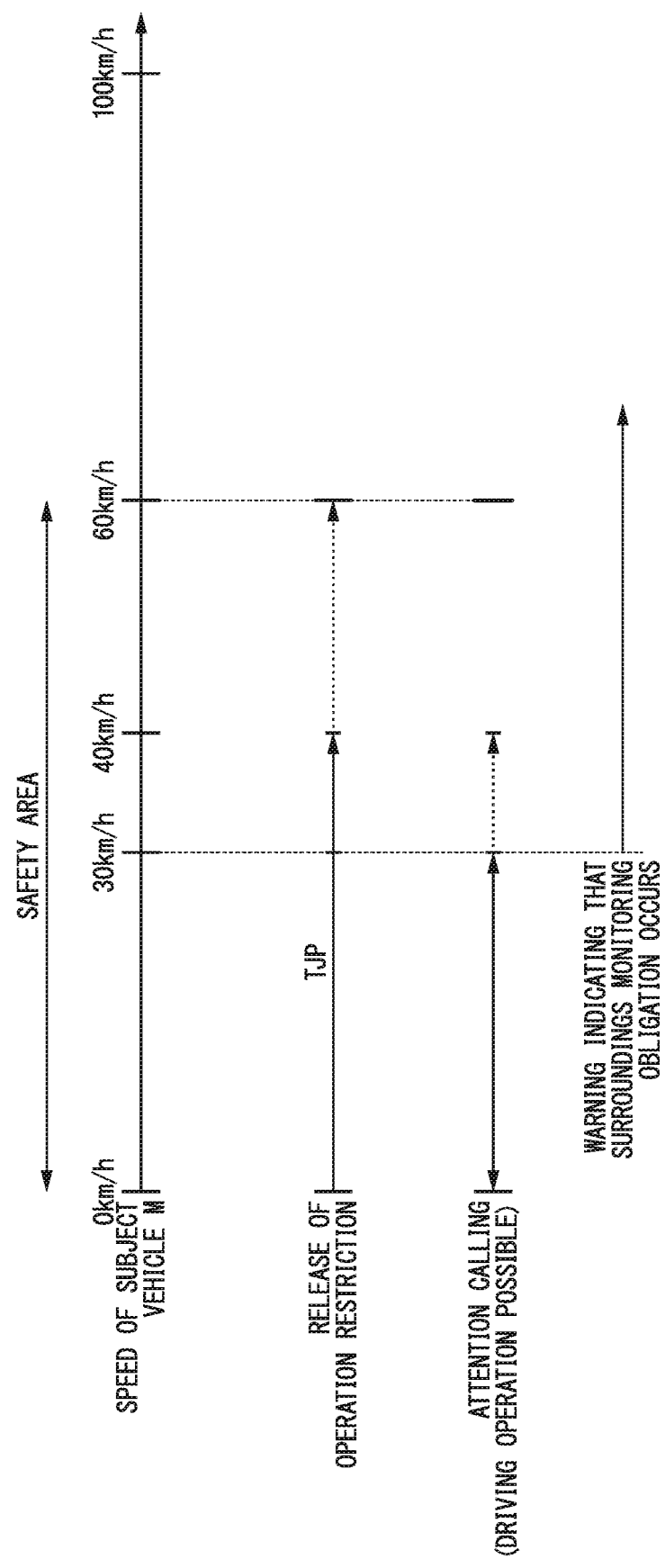
FIG. 15 is a diagram illustrating a timing of HMI control.

FIG. 15 is a diagram illustrating a timing of the HMI control. An example of FIG. 15 shows timings of switching from the congestion following mode (the first mode) of the automated driving to the driving mode in which the traveling speed is accelerated due to the subject vehicle M being congested while traveling on a highway, and output of a warning indicating that the vehicle occupant has the surroundings monitoring obligation in this case. In the example of FIG. 15, the interface control unit 174 causes predetermined information to be output on the interface device before the mode of automated driving is changed to the mode in which the surroundings monitoring obligation of the vehicle occupant increases on a speed basis (the mode in which the degree of automated driving decreases) when the mode of automated driving is changed.

For example, when the subject vehicle M follows a preceding vehicle according to the congestion following mode of automated driving and travels at a speed of 0 km/h to 60 km/h as illustrated in FIG. 15, the subject vehicle M can automatically stop, for example, according to a system such as automatic emergency braking (AEB) (safety area). In the example of FIG. 15, when the traveling speed of the subject vehicle M is 60 km/h or less, the automated driving is performed in the first mode, and when the traveling speed exceeds 60 km/h, the automated driving is performed in the second mode. In this case, the operation restriction of the interface devices (for example, the navigation device 50, the display device 82, and the content reproduction device 85) or the like of the non-driving operation system of the HMI 70 according to the automated driving is released, and the vehicle occupant can freely operate the interface devices.

However, for example, when the TJP ends at the traveling speed of 40 km/h, the operation with respect to the interface device is restricted (operation restriction release is released) from the traveling speed of 40 km/h or more, as illustrated in FIG. 15. Thus, the operation restriction on the interface device may not always be the same as the operation restriction at the time of switching of the driving mode. Therefore, the interface control unit 174 performs output of the predetermined information (information indicating that the surroundings monitoring obligation occurs (increases)) at a speed (for example, 30 km/h) lower than the speed at which the operation restriction is performed (for example, 40 km/h)). Further, the interface control unit 174 may output information such as calling attention (drive investigation available) in a predetermined speed section (for example, 0 km/h to 30 km/h illustrated in FIG. 15) before outputting the predetermined information.

For example, when the automated driving mode is switched on the basis of the speed reference and a speed of the subject vehicle M approaching a first speed (for example, 60 km/h) serving as a switching reference reaches a second speed (for example, 30 km/h) lower than the speed reference, the interface control unit 174 causes predetermined information (for example, a warning) to be output on the interface device. Further, when the speed of the subject vehicle M reaches a third speed (for example, 40 km/h) higher than the second speed and lower than the first speed, the interface control unit 174 restricts an operation of the vehicle occupant with respect to an interface device corresponds to the driving mode. Accordingly, the HMI control unit 170 can seamlessly perform "warning"→"operation restriction"→"mode switching".

Further, in the embodiment, the interface control unit 174 may detect, for example, the state of the vehicle occupant after performing output of information such as the warning, and perform control such as output of information using sound or the like and causing the seat 88 on which the vehicle occupant is seated to vibrate when the state has not been changed into a state in which the vehicle occupant can perform handover (for example, when the vehicle occupant is presumed to be asleep).

Further, when the state has not been changed into the state in which the vehicle occupant can perform the handover after the warning, the interface control unit 174 may cause the travel control unit 160 to perform traveling control for performing gradual acceleration (reducing an acceleration) over a period of time so that a time taken for the speed at which the driving mode is to be switched to be reached is longer than a normal time.

Figure 16:
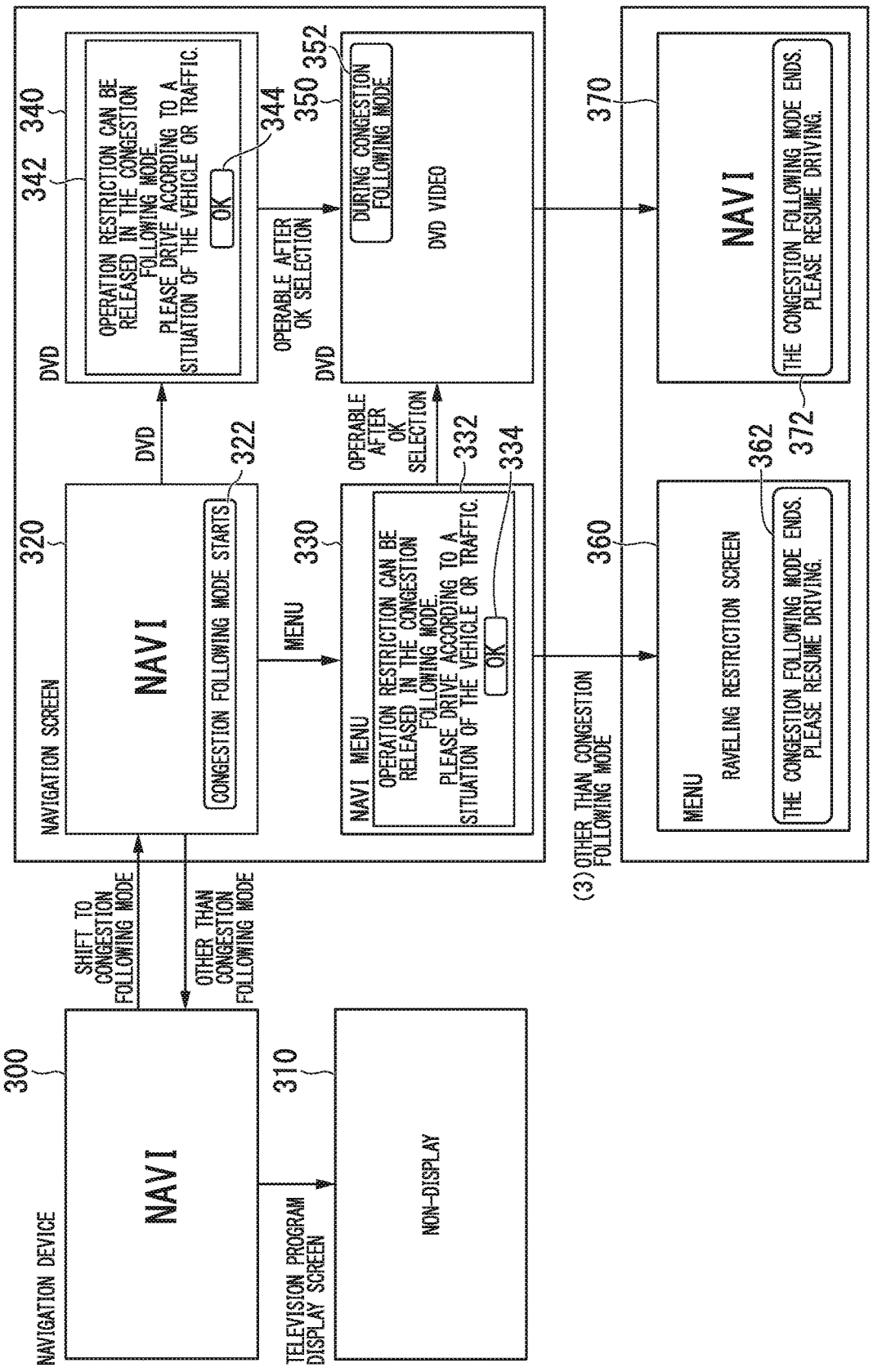
FIG. 16 is a diagram illustrating an example of information output from an interface device.

FIG. 16 is a diagram illustrating an example of information output from the interface device. In description of the example of FIG. 16, an example of the first mode described above is the congestion following mode, and an example of the second mode described above is a mode other than the congestion following mode.

In the example of FIG. 16, when the subject vehicle M is in a mode other than the congestion following mode (in the case of "(1) other than congestion following mode" illustrated in FIG. 16), the vehicle occupant of the subject vehicle M has the surroundings monitoring obligation. Accordingly, a predetermined operation with respect to the interface device is restricted. Therefore, as illustrated in FIG. 16, a navigation screen 300 can be displayed, whereas a screen 310 on which a television program is displayed is set as a non-display.

Here, as illustrated in FIG. 16, when the mode is shifted from a mode other than the congestion following mode to the congestion following mode due to the automated driving of the subject vehicle M (in the case of "(2) congestion following mode" illustrated in FIG. 16), a screen for route guidance is displayed on a navigation screen 320 and, in this case, a message screen 322 indicating that the congestion following mode starts is displayed.

Further, when shift from the navigation screen 320 to a menu screen 330 has occurred, a message screen 332 such as "Operation restriction can be released in the congestion following mode. Please drive according to a situation of the vehicle or traffic" is displayed and an OK button 334 is displayed, such that the vehicle occupant can be notified of, for example, calling attention. It should be noted that the content of the message is not limited to thereto. The interface control unit 174 receives the vehicle occupant selecting the OK button 334 to release the operation restriction, and causes a transition to a DVD screen 340 to be performed such that the navigation device 50 or the like can be operated.

Further, similarly, even when a transition from the navigation screen 320 to the DVD screen 340 is performed by a DVD operation, a message screen 342 and an OK button 344 described above are displayed such that the vehicle occupant can be notified of, for example, calling attention. The interface control unit 174 receives the vehicle occupant selecting the OK button 344 to release the operation restriction, and causes the transition to the DVD screen to be performed such that the navigation device 50 or the like can be operated.

Here, the interface control unit 174 displays a message 352 indicating the congestion following mode in an overlapped manner on a DVD video display screen 350 to which the transition has been performed, such that the vehicle occupant can safely watch a DVD video. It should be noted that the interface control unit 174 may acquire, for example, traffic information (congestion information) on a traveling road from the external device using the communication device 55, calculate information (for example, a duration) indicating how long the congestion following mode is to continue from the acquired traffic information, and causes the calculated information to be displayed as the message 352. Accordingly, the vehicle occupant can ascertain how much time the vehicle occupant can watch the DVD video or the like, and can safely watch the image.

Further, when the surroundings monitoring obligation for the subject vehicle is generated due to the mode change from the congestion following mode (in the case of "(3) other than congestion following mode" illustrated in FIG. 13), transition from the menu screen 330 to a traveling restriction screen 360 is performed and a message 362 indicating that traveling restriction is performed is displayed. As an example of the message, a message such as "The congestion following mode ends. Please resume driving." is displayed at a time set according to the state (driving intention or the like) of the vehicle occupant, as illustrated in FIG. 16. Further, in the transition from the DVD video display screen 350, the navigation screen 370 is similarly displayed, and the same message 372 is displayed at a predetermined timing according to the state of the vehicle occupant. The messages 362 and 372 may be displayed for a predetermined period of time or may be displayed until the mode is switched. Further, the content of the message is not limited to the example described above. Further, each message illustrated in FIG. 16 may be output as sound together with a screen display or may be output as only sound.

As illustrated in FIG. 16, the interface control unit 174 changes the presence or absence or the aspect of the output of the predetermined information on the basis of the use state of the interface device. Accordingly, the vehicle occupant can acquire appropriate information on switching of the driving mode from the interface device. According to the information output using the interface device described above, the vehicle occupant can more reliably perform, for example, the preparation for driving or surroundings monitoring prior to the manual driving at a predetermined timing before actual switching.

<Processing Flow>

Hereinafter, a flow of a process of the vehicle control system 100 according to the embodiment will be described. It should be noted that in the following description, a flow of the HMI control process regarding a notification to the vehicle occupant which is mainly performed by the HMI control unit 170 among various processes in the vehicle control system 100 will be described.

First Example

Figure 17:
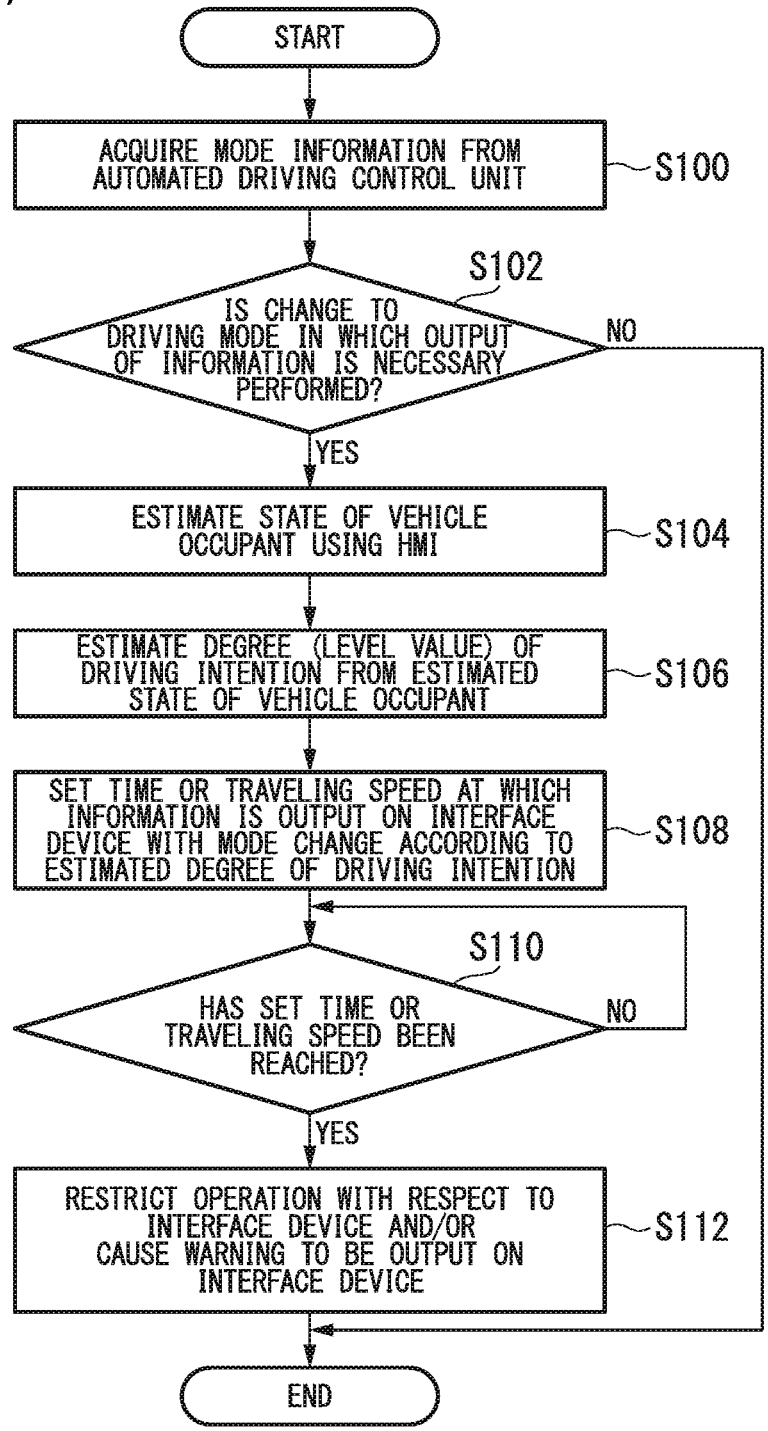
FIG. 17 is a flowchart showing a first example of an HMI control process.

FIG. 17 is a flowchart showing a first example of the HMI control process. In the example of FIG. 17, the HMI control unit 170 acquires mode information from the automated driving control unit 120 (step S100). Then, the state estimation unit 172 determines whether or not a change of a driving mode in which output of information is necessary (for example, a driving mode in which the surroundings monitoring obligation of the vehicle occupant increases or a driving mode in which the degree of operation tolerance of the interface device decreases) is necessary (step S102), estimates the state of the vehicle occupant using the HMI 70 or the like when the change of the driving mode is necessary (step S104), and estimates a degree (level value) of driving intention from the estimated state of the vehicle occupant (step S106).

Then, the state estimation unit 172 sets a time or a traveling speed at which information is to output on the HMI 70 with the mode change according to a degree of the driving intention estimated by referring to the above-described HMI control information 188 (step S108). Then, the interface control unit 174 determines whether or not the set time or traveling speed has been reached (step S110). When the set time or traveling speed has been reached, the interface control unit 174 restricts an operation with respect to the interface device and/or causes a warning to be output on the interface device (step S112) before transferring the surroundings monitoring obligation to the vehicle occupant, and ends this flowchart.

It should be noted that in the process of step S112, the interface control unit 174 may perform the restriction of the operation with respect to the interface device and the output of the warning step by step. Further, when the change of the driving mode is not a change of the driving mode in which notification is necessary in the process of step S102, this flowchart ends as it is. It should be noted that the HMI control process illustrated in FIG. 17 described above may be executed when the mode information has been acquired from the automated driving control unit or may be performed at fixed time intervals.

Second Example

Figure 18:
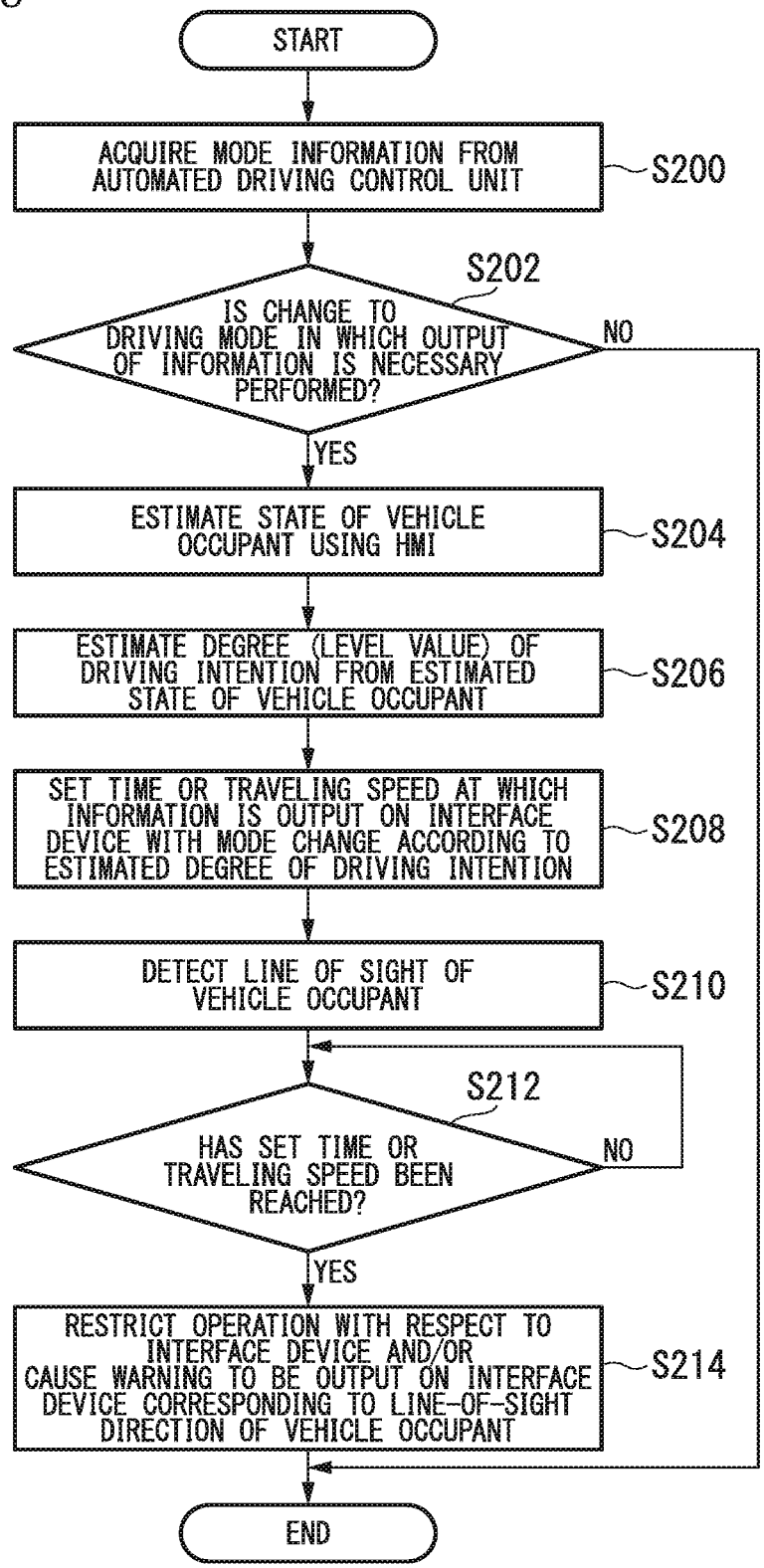
FIG. 18 is a flowchart showing a second example of the HMI control process.

FIG. 18 is a flowchart showing a second example of the HMI control process. In the example of FIG. 18, since processes of steps S200 to S208 are the same as the processes of steps S100 to S108 in the first example, detailed description thereof will be omitted.

After the process of step S208, the state estimation unit 172 detects a line of sight of the vehicle occupant from the image captured by the vehicle cabin camera 95 (step S210). Then, the interface control unit 174 determines whether or not the set time or traveling speed has been reached (step S212). When the set time or traveling speed has been reached, the interface control unit 174 restricts the operation with respect to the interface device and/or causes a warning to be output on the interface device corresponding to the line-of-sight direction of the vehicle occupant before the surroundings monitoring obligation is transferred to the vehicle occupant (step S214) and ends this flowchart.

It should be noted that in the process of step S212, the interface control unit 174 may perform the restriction of the operation with respect to the interface device and the output of the warning step by step. Further, when the change of the driving mode is not a change of the driving mode in which notification is necessary in the process of step S202, this flowchart ends as it is. It should be noted that the HMI control process illustrated in FIG. 18 described above may be executed when the mode information has been acquired from the automated driving control unit or may be performed at fixed time intervals. According to the second example, information such as the warning is caused to output on the interface device that is in the line-of-sight direction of the vehicle occupant, such that the information output to the vehicle occupant can be recognized more reliably. It should be noted that some or all of the above-described examples may be combined as an embodiment.

According to the embodiment described above, when the change to the mode of the automated driving in which the degree of automated driving decreases is performed in a state in which the restriction of the operation with respect to the interface device is relaxed or released, the state of the interface device returns to the state before the restriction is relaxed or released or the predetermined notification is performed before the predetermined time at which the change to the automated driving mode is performed. Thus, a period of preparation for switching of the automated driving can be given to the vehicle occupant. For example, according to the embodiment, it is possible to notify the vehicle occupant that the surroundings monitoring obligation of the subject vehicle M or the like is to be shifted to the vehicle occupant before the shift. Further, according to the embodiment, it is possible to notify the occupant of the vehicle, for example, that the degree of operation tolerance of the interface device is to decrease before the decrease.

Although the modes for carrying out the present invention have been described above by way of embodiments, the present invention is not limited to the embodiments at all, and various modifications and substitutions may be made without departing from the spirit of the present invention.

INDUSTRIAL APPLICABILITY

The present invention can be used in an automobile manufacturing industry.

REFERENCE SIGNS LIST

20 Finder
30 Radar
40 Camera
DD Detection device
50 Navigation device
55 Communication device
60 Vehicle sensor
70 HMI
100 Vehicle control system
110 Target lane determination unit
120 Automated driving control unit
130 Automated driving mode control unit
140 Subject-vehicle position recognition unit
142 Outside world recognition unit
144 Action plan generation unit
146 Trajectory generation unit
146A Traveling aspect determination unit
146B Trajectory candidate generation unit
146C Evaluation and selection unit
150 Switching control unit
160 Travel control unit 170 HMI control unit
172 State estimation unit
174 Interface control unit
180 Storage unit
200 Travel driving force output device
210 Steering device
220 Brake device
M Subject vehicle

What is claim is:

1. A vehicle control system comprising:
a processor; and
a memory that stores instruction that, when executed by the processor, causes the processor to perform operations, comprising:
automatically controlling at least one of acceleration, deceleration, and steering of a subject vehicle;
performing automated driving control in any one of a plurality of modes with different degrees of automated driving;
based on the one of the plurality of modes, receiving an operation of an occupant of the subject vehicle and restricting the operation with respect to at least one interface device of a plurality of interface devices on which predetermined information is output; and
determining a state of the occupant in the subject vehicle,
based on a change to a mode of the automated driving control and in response to a decrease in a degree of automated driving control being performed, displaying, via the at least one interface device, information indicating that the restricting of the operation has been relaxed or released and displaying predetermined information associated with the one of the plurality of modes,
in response to an input of the operation to be relaxed or released by the occupant, restricting the operation,
based on the information associated with the one of the plurality of operations being used by the occupant, and in response to the change to the one of the plurality of modes in which the degree of automated driving has been decreased, and the restricting of the operation having been relaxed or released, and before a predetermined time at which the change to the one of the plurality of modes is performed, transitioning from a first use state representing a state in which the interface device being used by the occupant to a second use state representing a state in which the interface device was before restricting the operation or before performance of a predetermined notification to the one of the plurality of operations being used by the occupant,
the predetermined time is set according to a driving intention level of the occupant in the subject vehicle,
wherein the predetermined time is a first predetermined time, setting, based on the driving intention level being determined to be high, the first predetermined time to be smaller than a second predetermined time set when the driving intention level is determined to be low,
wherein based on the restriction having been relaxed or released, the speed of the subject vehicle being equal to or greater than a first speed, and the mode of automated driving being switched to a lower degree of automated driving, the operations further comprise displaying the notification in response to determining that the speed of the subject vehicle has reached a notification start speed that is slower than the first speed,
wherein the notification start speed is set based on the driving intention level of the occupant, and
in response to determining that the driving intention level is high, setting the notification start speed to be faster relative to the notification start speed determined and set in response to determining that the driving intention level is low.

2. The vehicle control system according to claim 1, wherein the operations further comprise displaying predetermined information on the interface device before the predetermined time at which the change to the mode of the automated driving in which the degree of automated driving decreases is performed.

3. The vehicle control system according to claim 1, wherein the operations further comprise displaying predetermined information on the interface device when the mode of automated driving is changed to a mode in which the degree of automated driving decreases based on a speed of the subject vehicle, and based on the speed of the subject vehicle approaching the first speed representing a reference speed for the change and reaching a second speed that is lower than the reference speed.

4. The vehicle control system according to claim 3, wherein the operations further comprise restricting the operation of the occupant with respect to the interface device when the speed of the subject vehicle reaches a third speed that is higher than the second speed and lower than the first speed.

5. The vehicle control system according to claim 1, wherein the operations further comprise changing the presence or absence or an aspect of the display of the predetermined information based on a use state of the interface device.

6. The vehicle control system according to claim 1, wherein the operations further comprise displaying predetermined information on the interface device that is in a line-of-sight direction of the occupant of the subject vehicle.

7. The vehicle control system according to claim 1, wherein the degree of automated driving is one or both of an obligation required of the occupant to monitor an area surrounding the subject vehicle and the degree of operation tolerance associated with the interface device of the subject vehicle.

8. The vehicle control system according to claim 1,
wherein the operations further comprise determining the driving intention level of the occupant based on the first use state of the occupant in the subject vehicle, and
the predetermined time is set to be longer in response to the driving intention level being lower than a threshold value.

9. The vehicle control system according to claim 8,
wherein the operations further comprise determining that the driving intention level is lower than the threshold value based on determining that the occupant in the subject vehicle is asleep, and the predetermined time being set to a first time, and
determining that the driving intention level is higher than the threshold value based on determining that the occupant in the subject vehicle is gripping a steering wheel, and the predetermined time being set to a second time, and
wherein the first time is set to be longer than the second time.

10. The vehicle control system according to claim 1,
wherein the operations further comprise: based on restricting the operation, displaying the notification based on at least one of the predetermined time and the notification start speed determined in response to changing the mode of automated driving that reduces the degree of automated driving.

11. A vehicle control method comprising:
automatically controlling, by an in-vehicle computer comprising a processor, at least one of acceleration, deceleration, and steering of a subject vehicle and performing automated driving control in any one of a plurality of modes with different degrees of automated driving;
based on the one of the plurality of modes, receiving, by the in-vehicle computer, an operation of an occupant of the subject vehicle and restricting the operation with respect to at least one interface device of a plurality of interface devices on which predetermined information is output;
determining, by the in-vehicle computer, a driving intention level from a state of the occupant in the subject vehicle;
based on a change to a mode of the automated driving control and in response to a decrease in a degree of automated driving control being performed, displaying, by the in-vehicle computer, information indicating that the restricting of the operation has been relaxed or released and displaying predetermined information associated with the one of the plurality of modes,
in response to an input of the operation to be relaxed or released by the occupant, restricting, by the in-vehicle computer, the operation, and
based on the information associated with the one of the plurality of operations being used by the occupant, and in response to the change to the one of the plurality of modes in which the degree of automated driving has been decreased, and the restricting of the operation having been relaxed or released, and before a predetermined time at which the change to the one of the plurality of modes is performed, transitioning, by the in-vehicle computer, from a first use state representing a state in which the interface device being used by the occupant to a second use state representing a state in which the interface device was before restricting the operation or before performing of a predetermined notification to the one of the plurality of operations being used by the occupant,
the predetermined time is set according to the driving intention level of the occupant in the subject vehicle,
wherein the predetermined time is a first predetermined time, setting, based on the driving intention level being determined to be high, the first predetermined time to be smaller than a second predetermined time set when the driving intention level is determined to be low,
wherein based on the restriction having been relaxed or released, the speed of the subject vehicle being equal to or greater than a first speed, and the mode of automated driving being switched to a lower degree of automated driving, the operations further comprise displaying the notification in response to determining that the speed of the subject vehicle has reached a notification start speed that is slower than the first speed,
wherein the notification start speed is set based on the driving intention level of the occupant, and
in response to determining that the driving intention level is high, setting the notification start speed to be faster relative to the notification start speed determined and set in response to determining that the driving intention level is low.

12. A non-transitory computer readable storage medium storing program instructions that cause an vehicle control program to facilitate performance of operations, comprising:
automatically controlling at least one of acceleration, deceleration, and steering of a subject vehicle and performing automated driving control in any one of a plurality of modes with different degrees of automated driving;
based on the one of the plurality of modes, receiving an operation of an occupant of the subject vehicle and restricting the operation with respect to at least one interface device of a plurality of interface devices on which predetermined information is output;
determining a driving intention level from a state of the occupant in the subject vehicle; and
based on a change to a mode of the automated driving control and in response to a decrease in a degree of automated driving control being performed, displaying, by the in-vehicle computer, information indicating that the restricting of the operation has been relaxed or released and displaying predetermined information associated with the one of the plurality of modes,
in response to an input of the operation to be relaxed or released by the occupant, restricting, by the in-vehicle computer, the operation, and
based on the information associated with the one of the plurality of operations being used by the occupant, and in response to the change to the one of the plurality of modes in which the degree of automated driving is decreased, and the restricting of the operation having been relaxed or released, and before a predetermined time at which the change to the one of the plurality of modes is performed, transitioning from a first use state representing a state in which the interface device being used by the occupant to a second use state representing a state in which the interface device was before restricting the operation or before performing a predetermined notification to the one of the plurality of operations being used by the occupant,
the predetermined time is set according to the estimated driving intention level of the occupant in the subject vehicle,
wherein the predetermined time is a first predetermined time, setting, based on the driving intention level being determined to be high, the first predetermined time to be smaller than a second predetermined time set when the driving intention level is determined to be low,
wherein based on the restriction having been relaxed or released, the speed of the subject vehicle being equal to or greater than a first speed, and the mode of automated driving being switched to a lower degree of automated driving, the operations further comprise displaying the notification in response to determining that the speed of the subject vehicle has reached a notification start speed that is slower than the first speed,
wherein the notification start speed is set based on the driving intention level of the occupant, and
in response to determining that the driving intention level is high, setting the notification start speed to be faster relative to the notification start speed determined and set in response to determining that the driving intention level is low.

* * * * *